US012716988B2

(12) United States Patent
Dong et al.

(10) Patent No.: US 12,716,988 B2
(45) Date of Patent: Aug. 25, 2026

(54) METHOD FOR INITIALIZING NEWLY ADDED BASE STATION IN UWB SYSTEM, TERMINAL, AND SYSTEM

(71) Applicant: Huawei Technologies Co., Ltd., Shenzhen (CN)

(72) Inventors: Wei Dong, Xi'an (CN); Haowei Xu, Xi'an (CN); Qingfeng Xue, Xi'an (CN); Erli Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 543 days.

(21) Appl. No.: 18/263,379

(22) PCT Filed: Dec. 9, 2021

(86) PCT No.: PCT/CN2021/136906
§ 371 (c)(1), (2) Date: Jul. 28, 2023

(87) PCT Pub. No.: WO2022/160966
PCT Pub. Date: Aug. 4, 2022

(65) Prior Publication Data

US 2024/0118375 A1 Apr. 11, 2024

(30) Foreign Application Priority Data

Jan. 30, 2021 (CN) ......................... 202110131725.4

(51) Int. Cl.
*G01S 5/02* (2010.01)
*G01S 13/02* (2006.01)

(52) U.S. Cl.
CPC ........ *G01S 5/0284* (2013.01); *G01S 13/0209* (2013.01)

(58) Field of Classification Search
None
See application file for complete search history.

(56) References Cited

U.S. PATENT DOCUMENTS

2010/0097269 A1* 4/2010 Loidl .................... G01S 5/0252 342/464
2010/0156708 A1 6/2010 Chen
(Continued)

FOREIGN PATENT DOCUMENTS

CN 106352869 A 1/2017
CN 111182450 A 5/2020
(Continued)

*Primary Examiner* — Adolf Dsouza
(74) *Attorney, Agent, or Firm* — Conley Rose, P.C.

(57) ABSTRACT

A method includes a device in an area 1 that requests a ultra-wideband (UWB) base station in the area 1 to measure an initial position, and starts inertial measurement unit (IMU) measurement. The device moves to an area 2, and the device requests to measure distances between each UWB base station in the area 2 and at least three locations (or obtain, at at least two locations, attitude data of the third electronic device when the device points to each UWB base station in the area 2). The device A mobile terminal returns to the area 1, and requests the UWB base station in the area 1 to measure an end point position. The device corrects coordinates of the device in the area 2 calculated using data obtained through the IMU measurement based on the measured end point position. Calculate the coordinates of each UWB base station in the area 2 based on the corrected coordinates in the area 2 and the measured distances between each UWB base station and the device in the area 2.

20 Claims, 27 Drawing Sheets

(56) References Cited

U.S. PATENT DOCUMENTS

| | | | | |
|---|---|---|---|---|
| 2015/0094081 | A1* | 4/2015 | Gupta | H04W 64/003 455/456.1 |
| 2015/0301167 | A1* | 10/2015 | Sentelle | A61B 5/0205 342/22 |
| 2021/0072029 | A1* | 3/2021 | Marques | H04W 4/33 |
| 2021/0392461 | A1* | 12/2021 | Cooper | G07C 9/00309 |

FOREIGN PATENT DOCUMENTS

| | | | |
|---|---|---|---|
| CN | 111194002 | A | 5/2020 |
| CN | 111385756 | A | 7/2020 |
| WO | 2020215711 | A1 | 10/2020 |

* cited by examiner

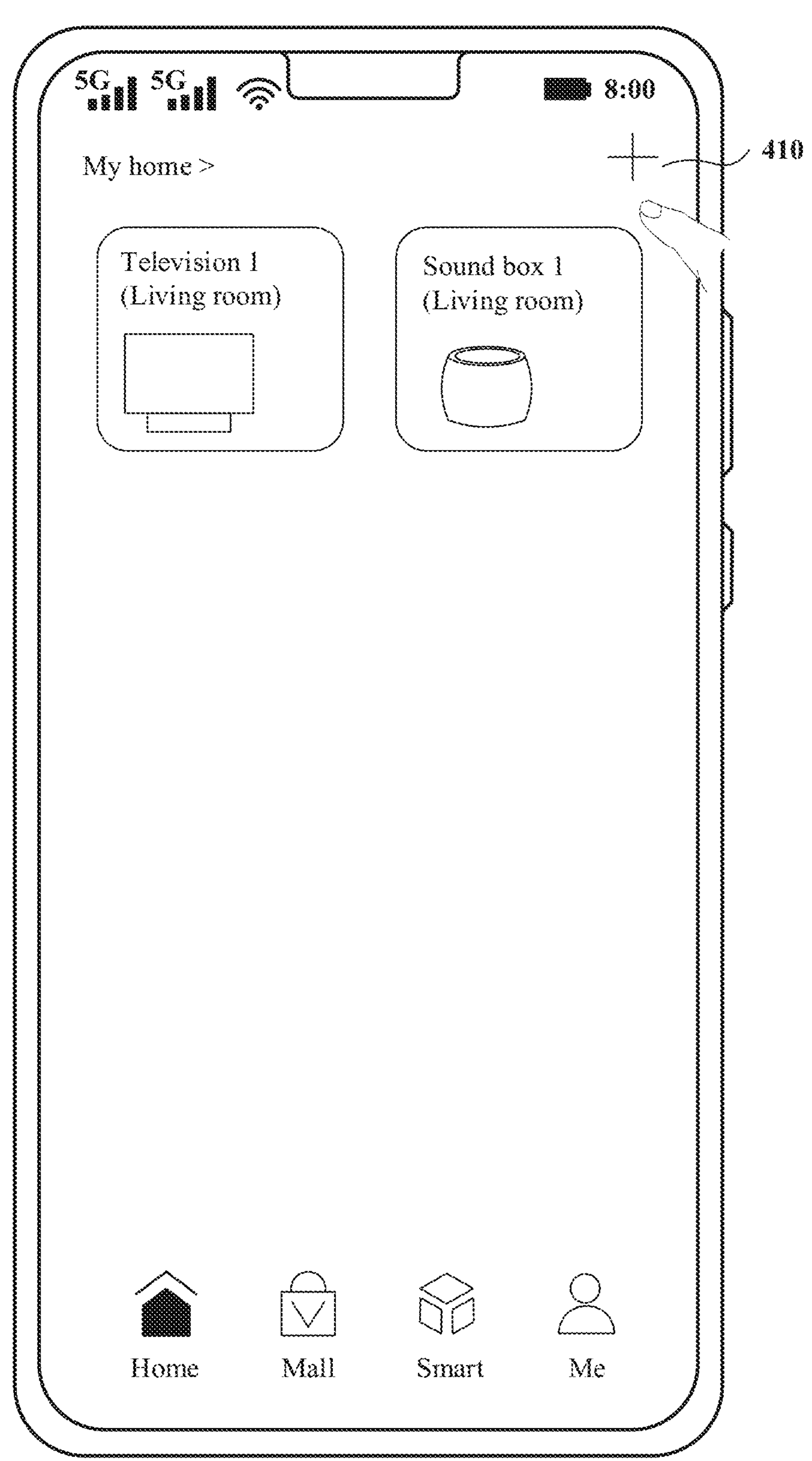
FIG. 4B(1)

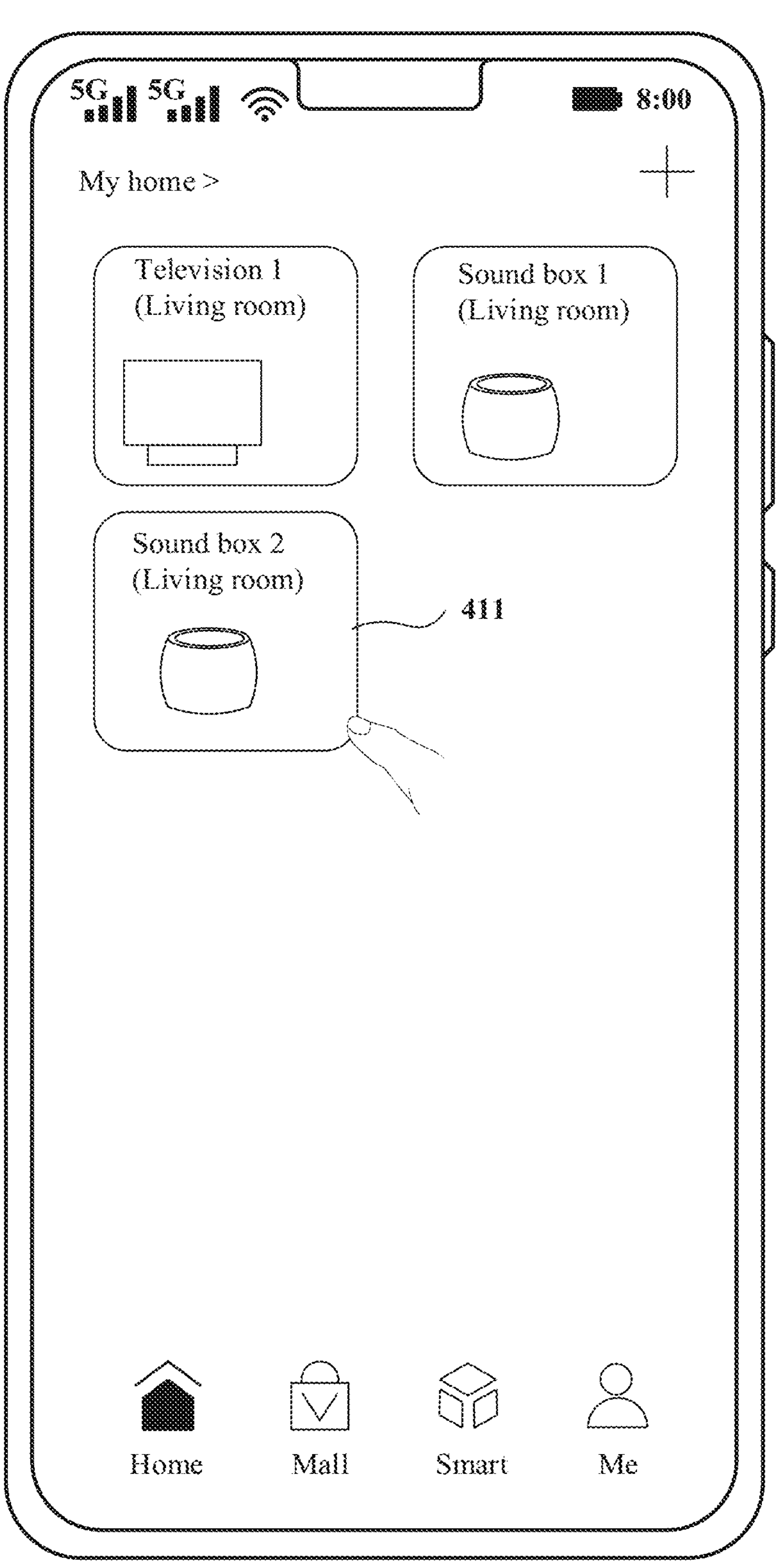
FIG. 4B(2)

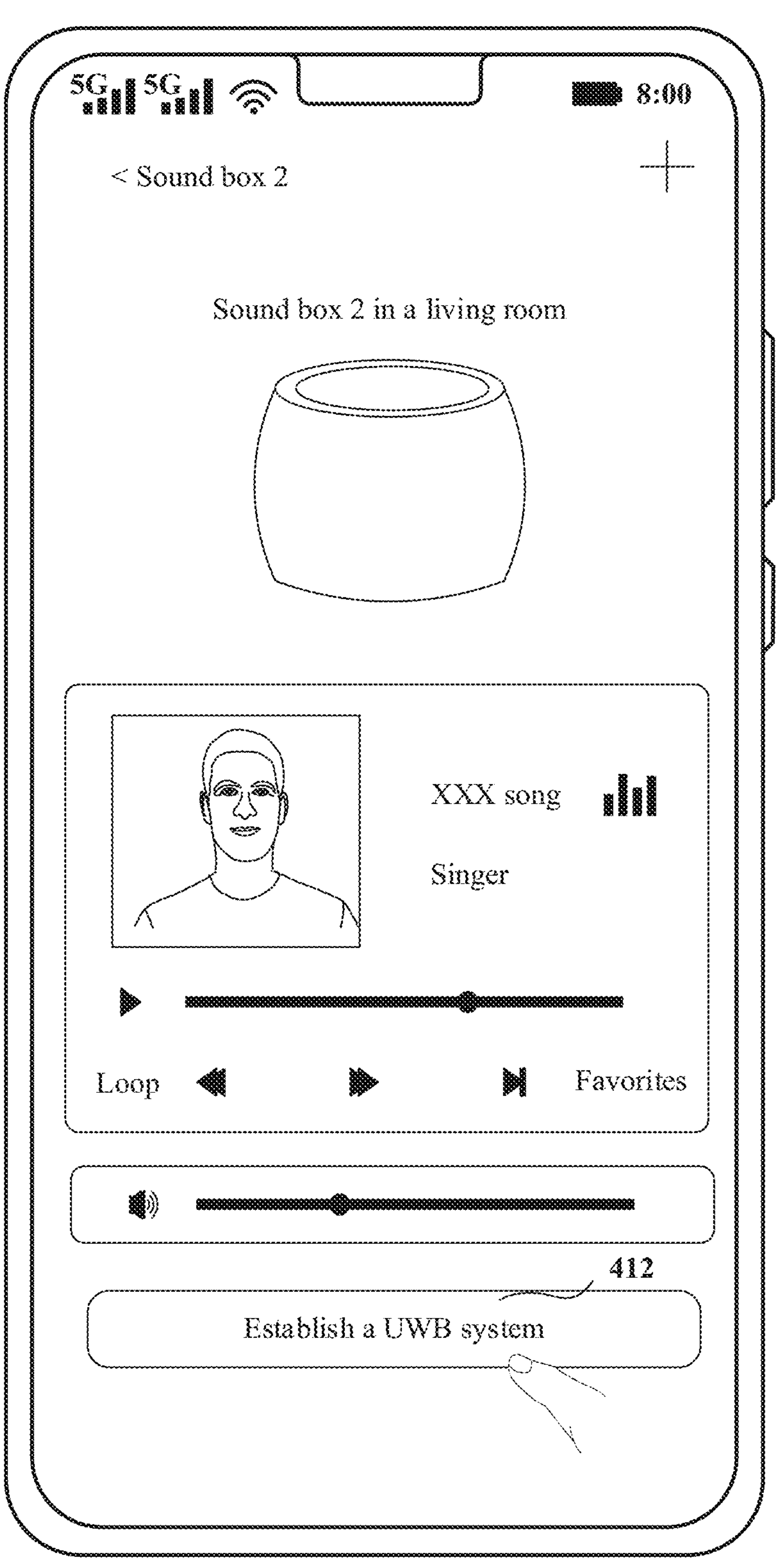
FIG. 4C(1)

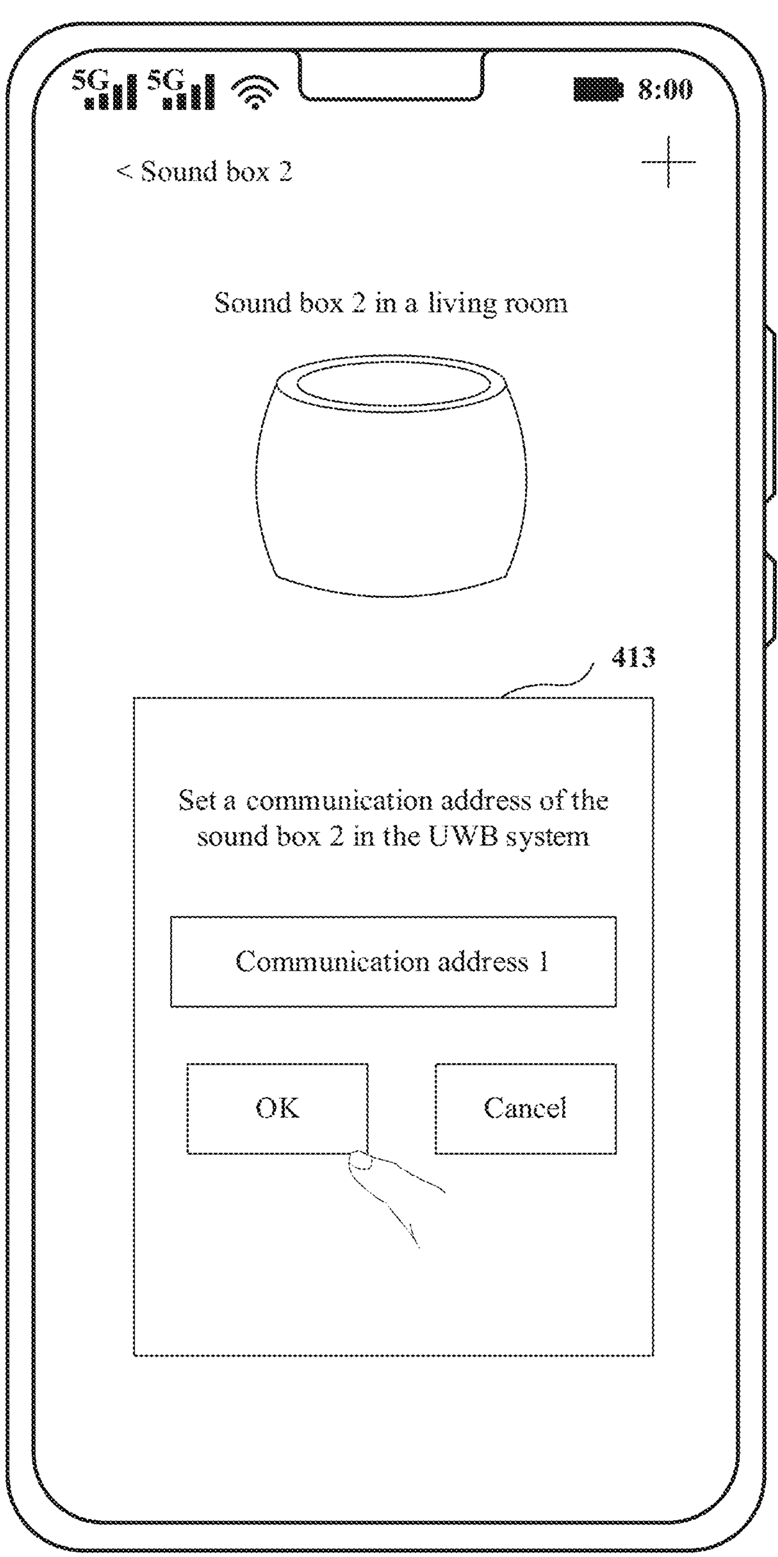
FIG. 4C(2)

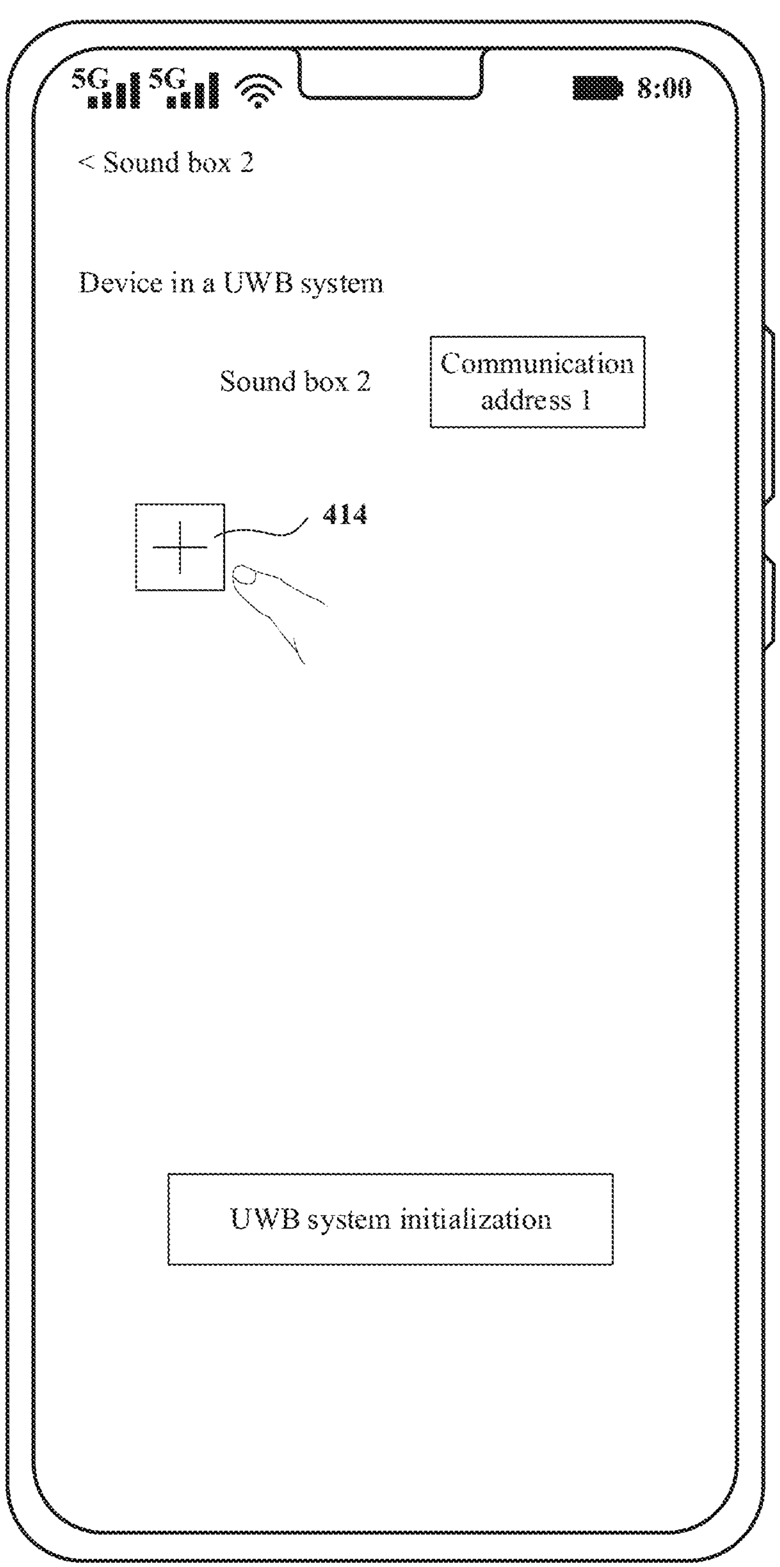
FIG. 4D(1)

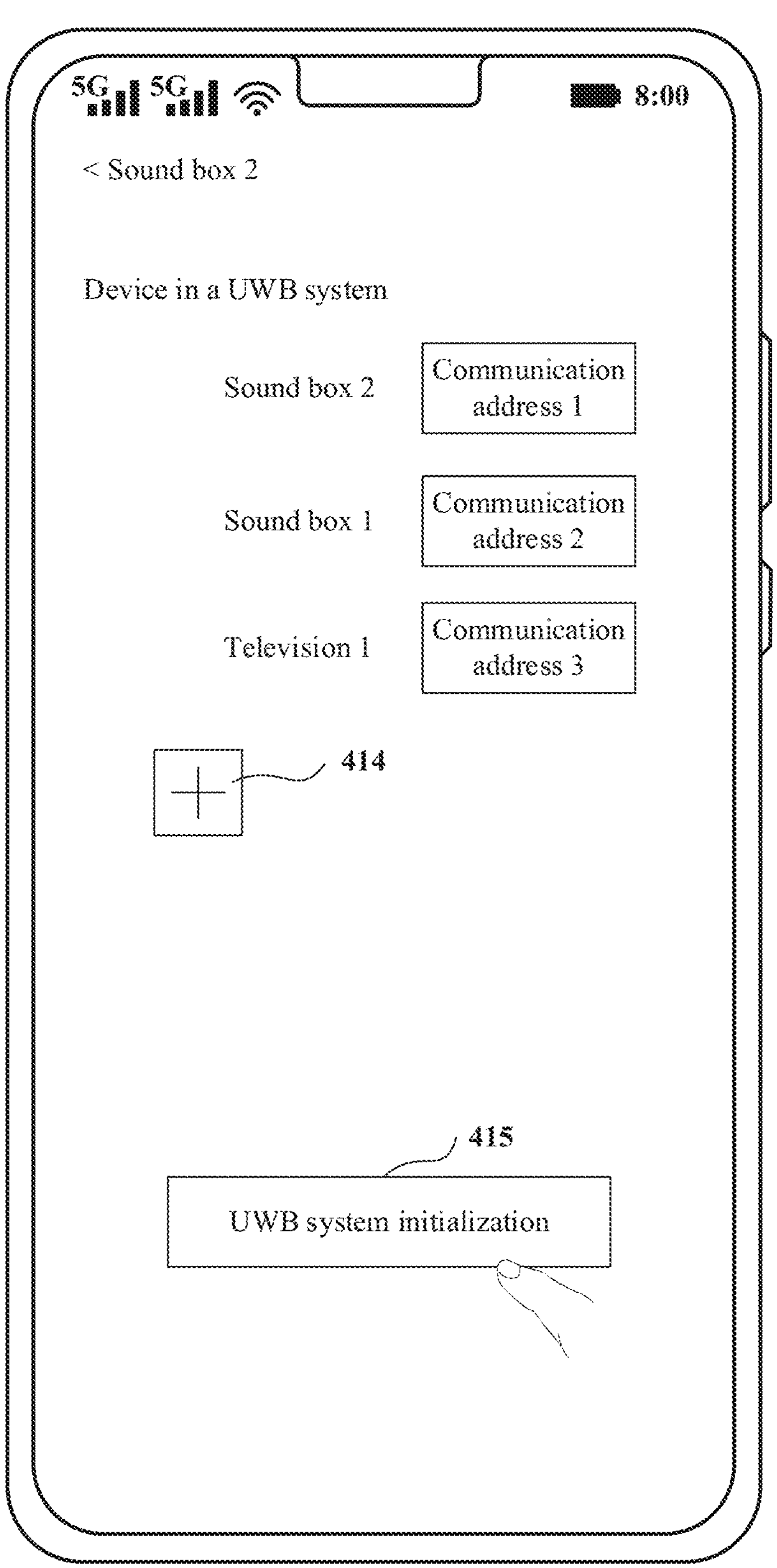
FIG. 4D(2)

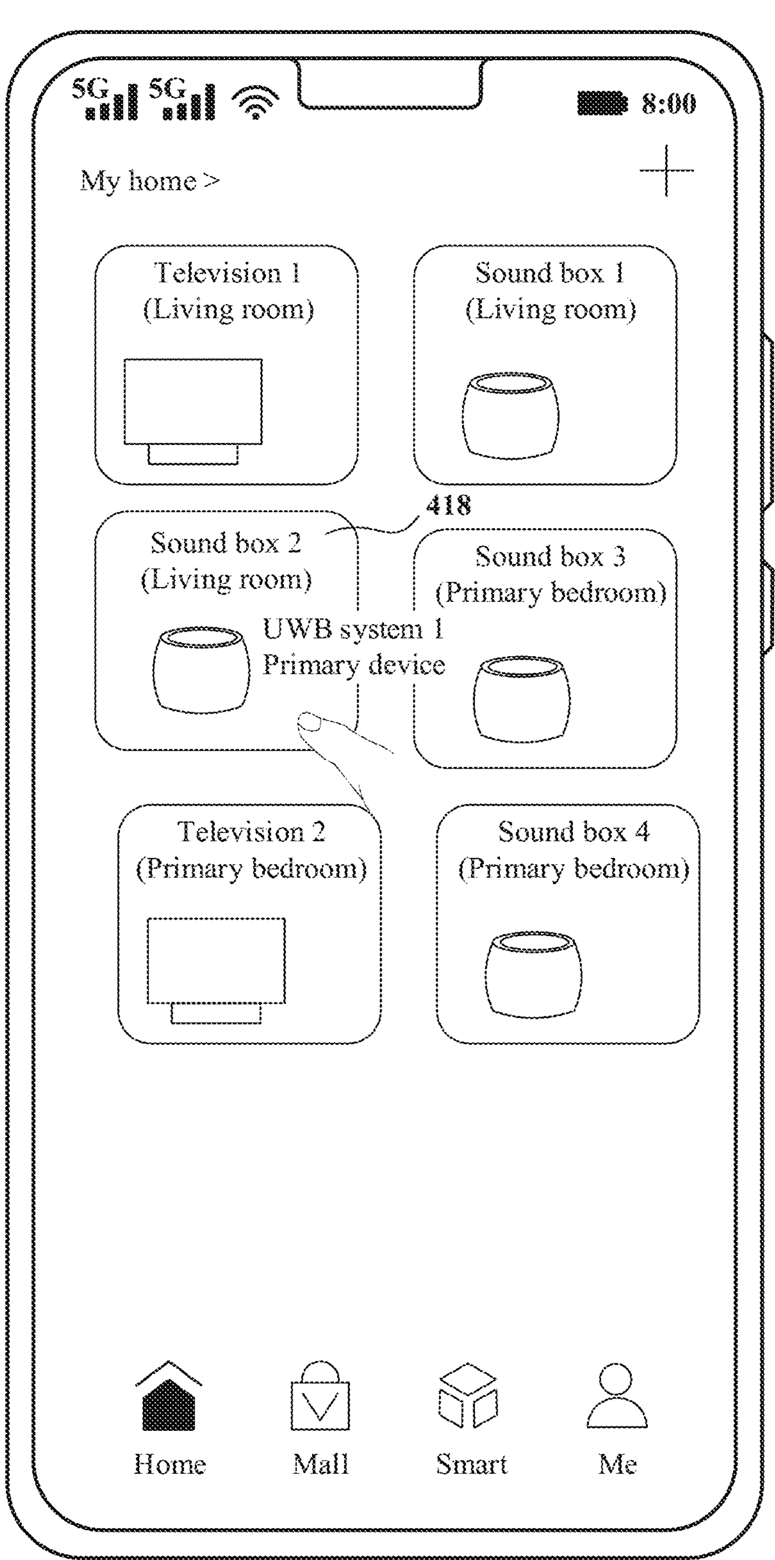
FIG. 4F(1)

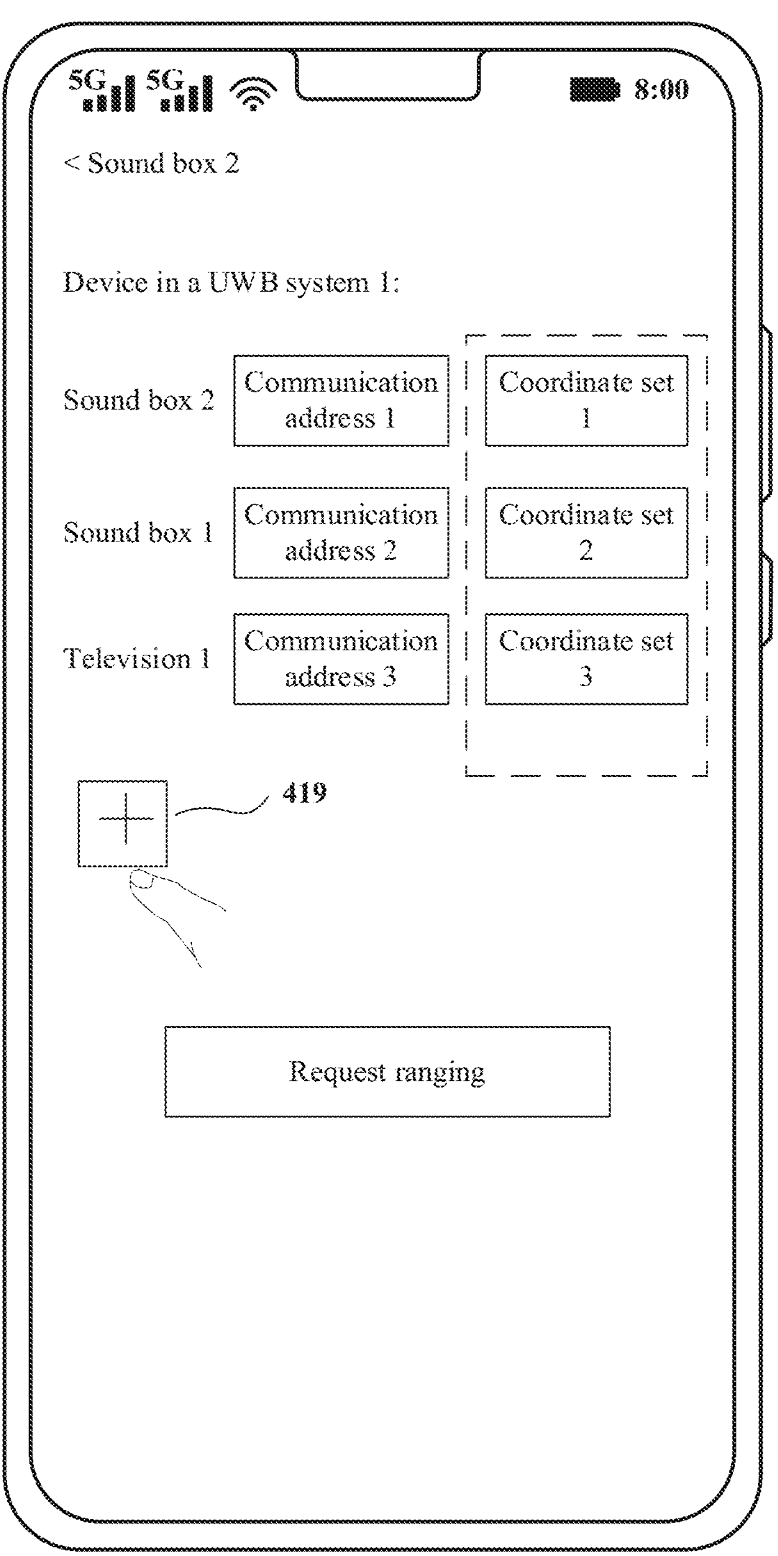
FIG. 4F(2)

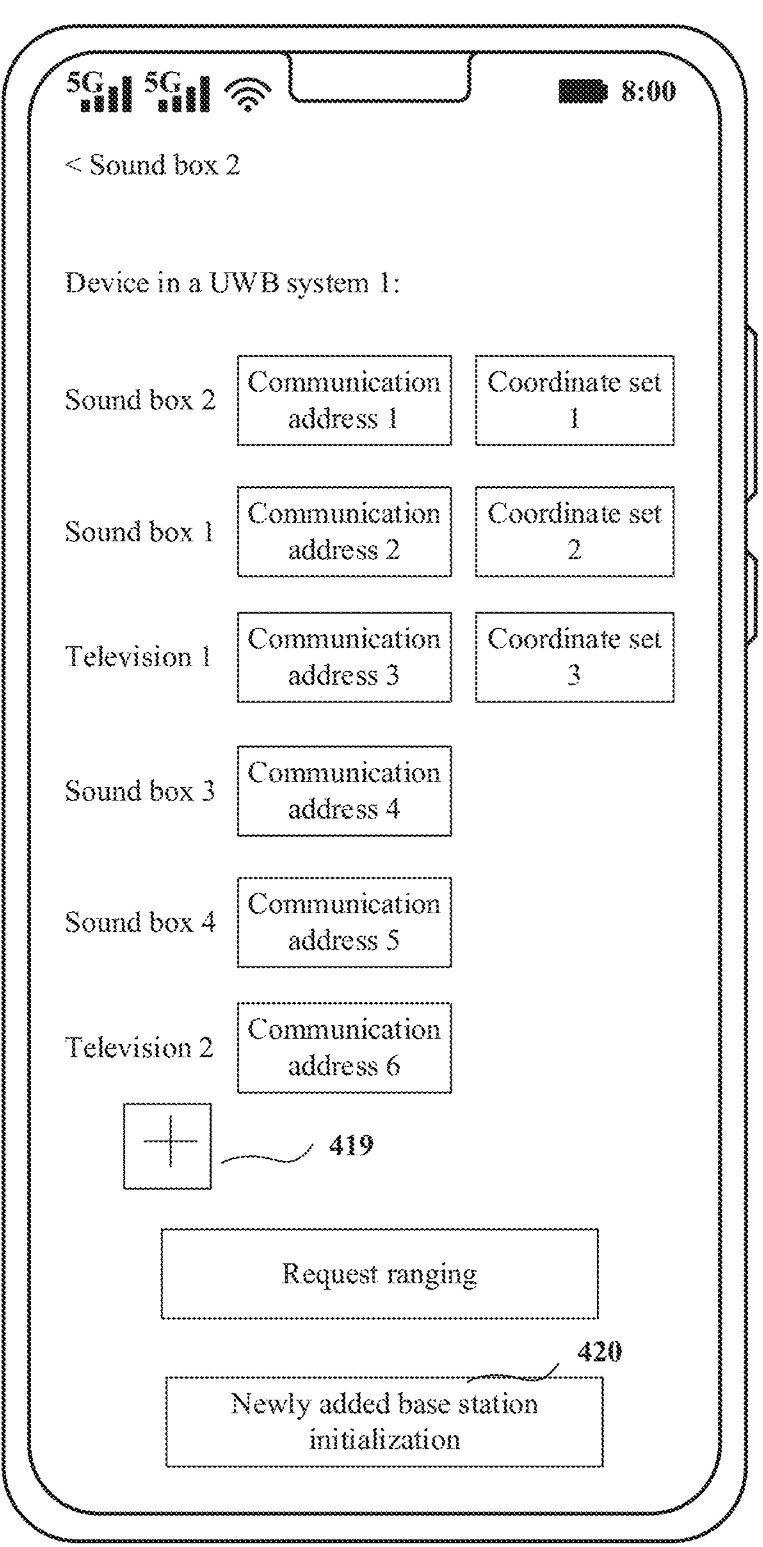
FIG. 4G(1)

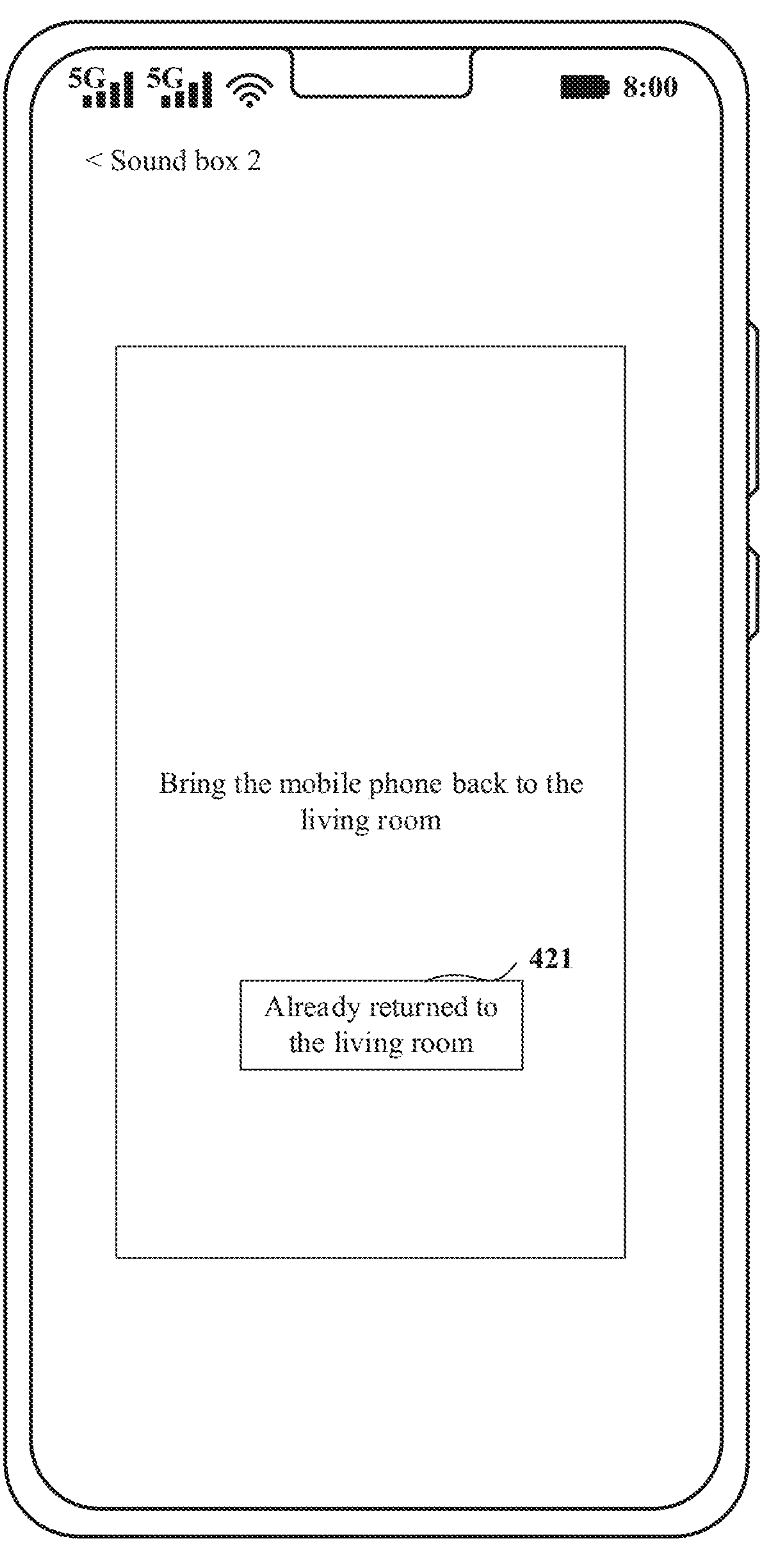
FIG. 4G(2)

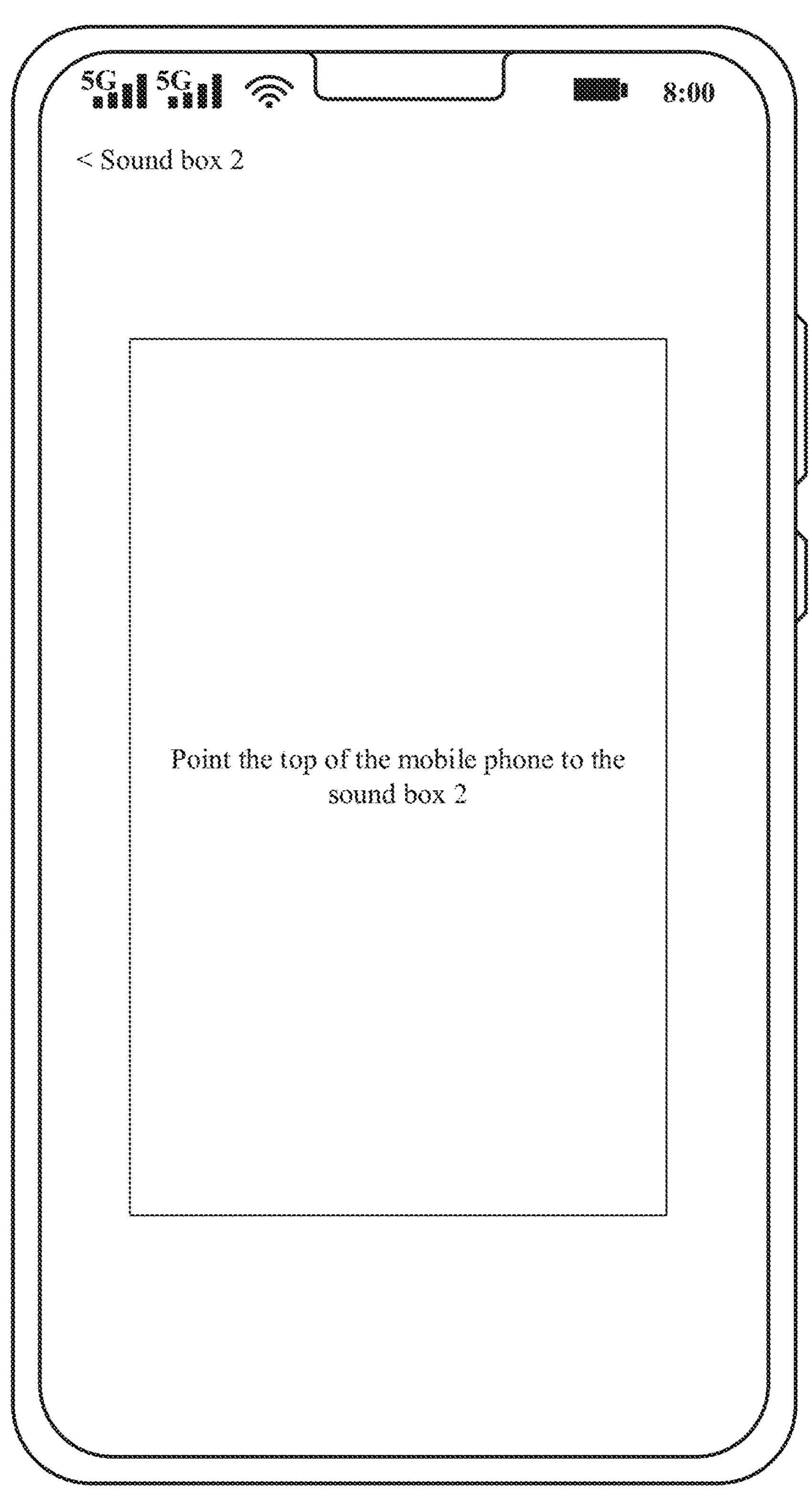
FIG. 4H(1)

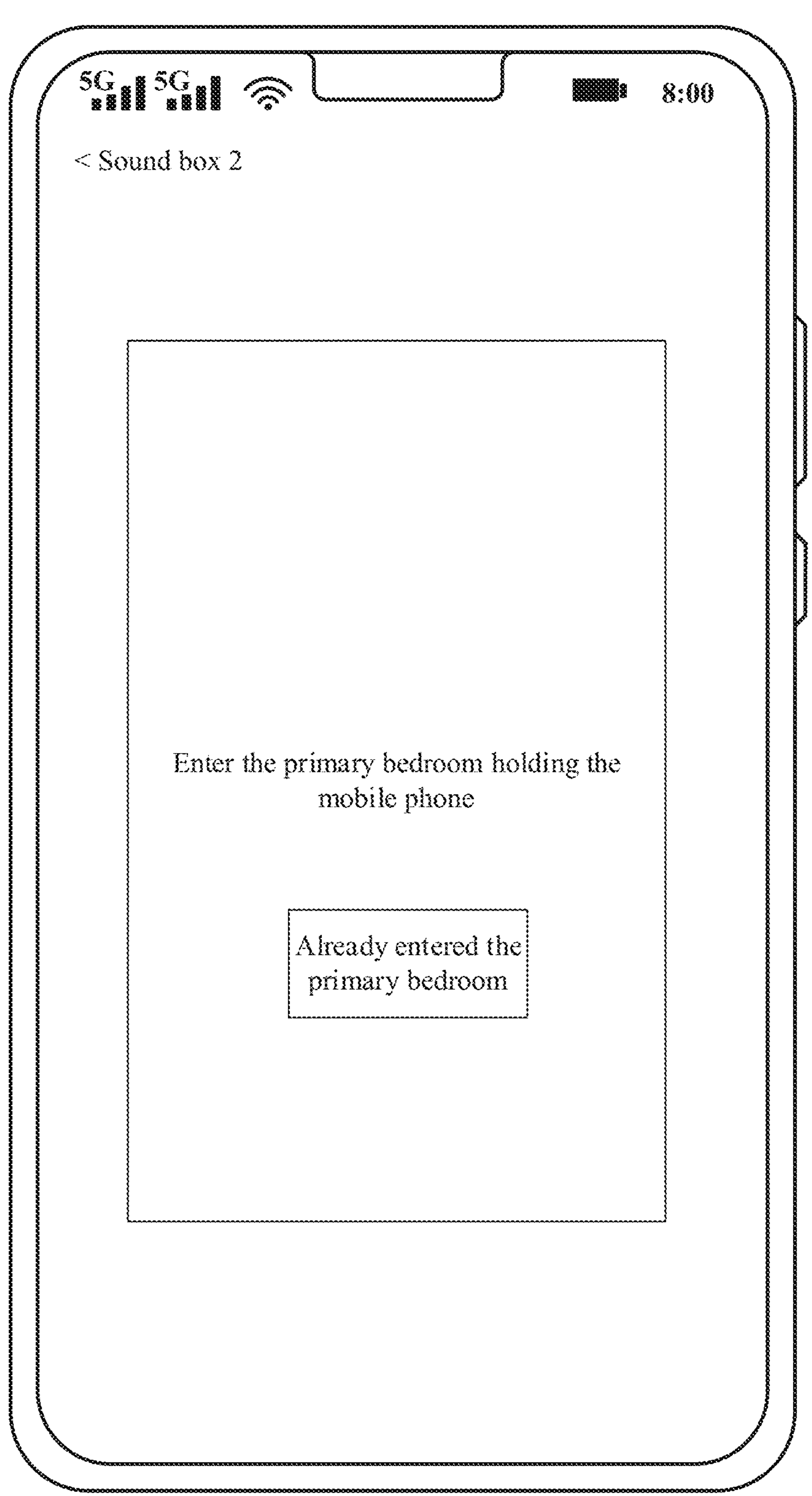
FIG. 4H(2)

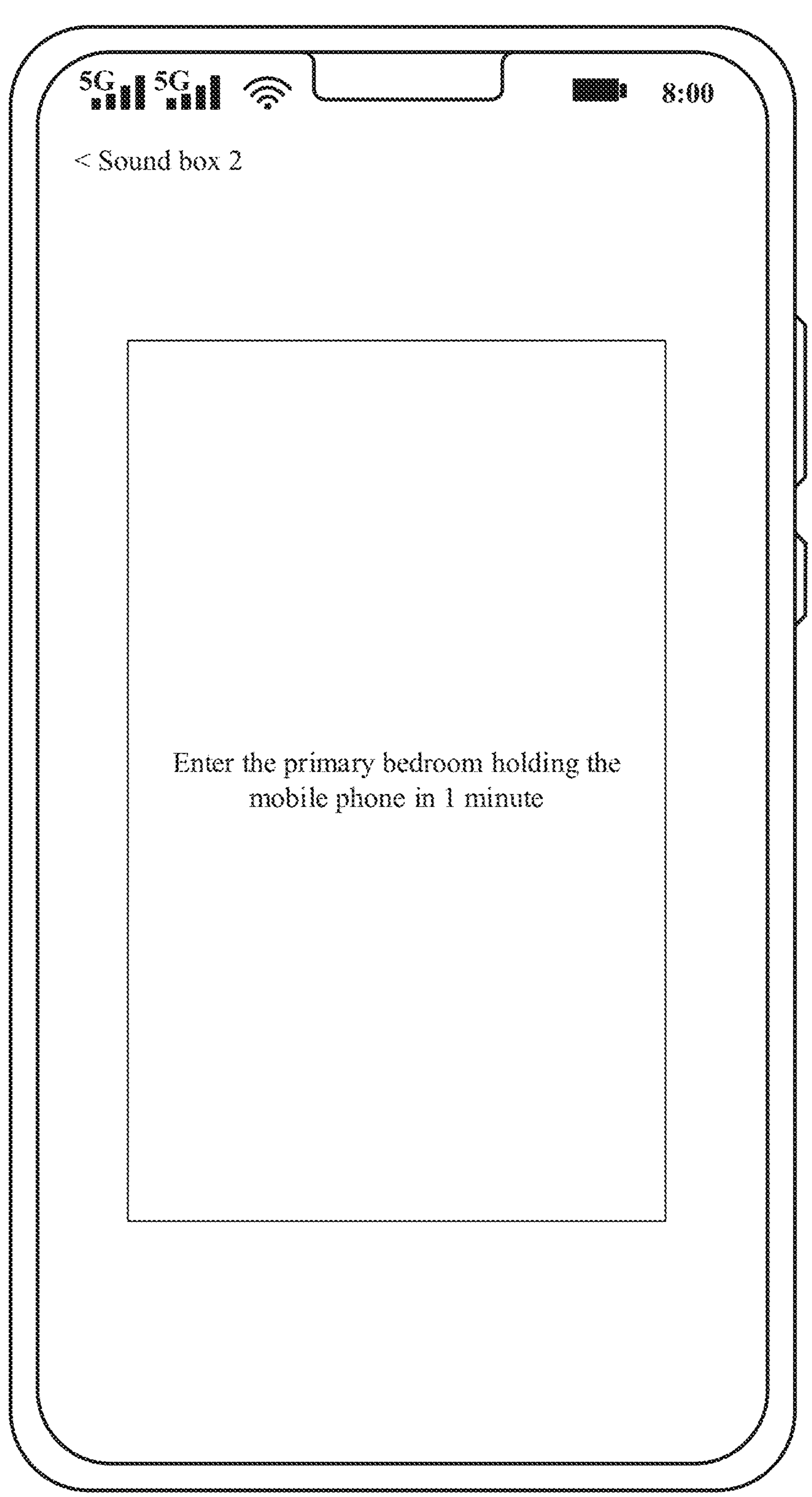
FIG. 4H(3)

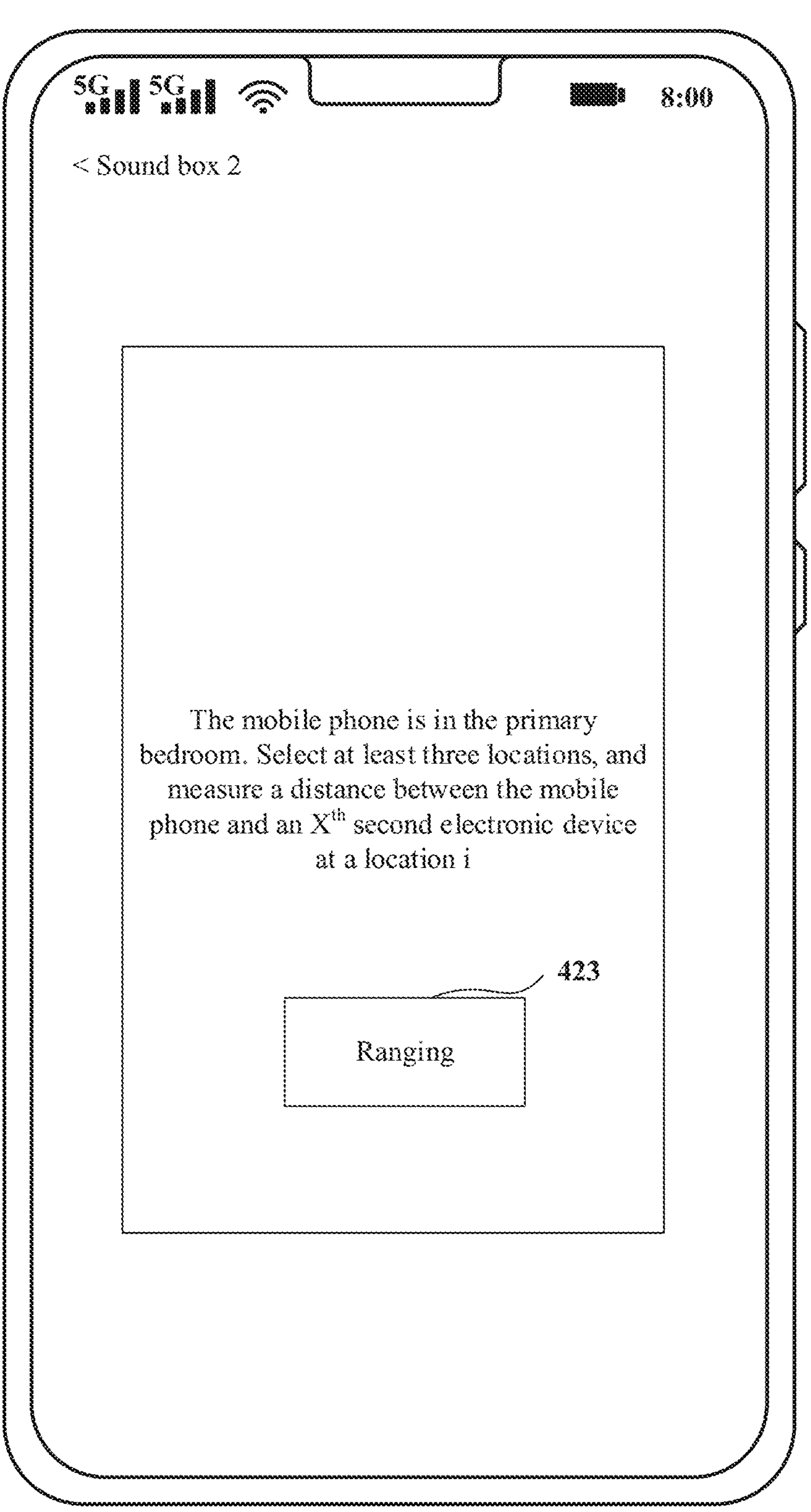
FIG. 4I(1)

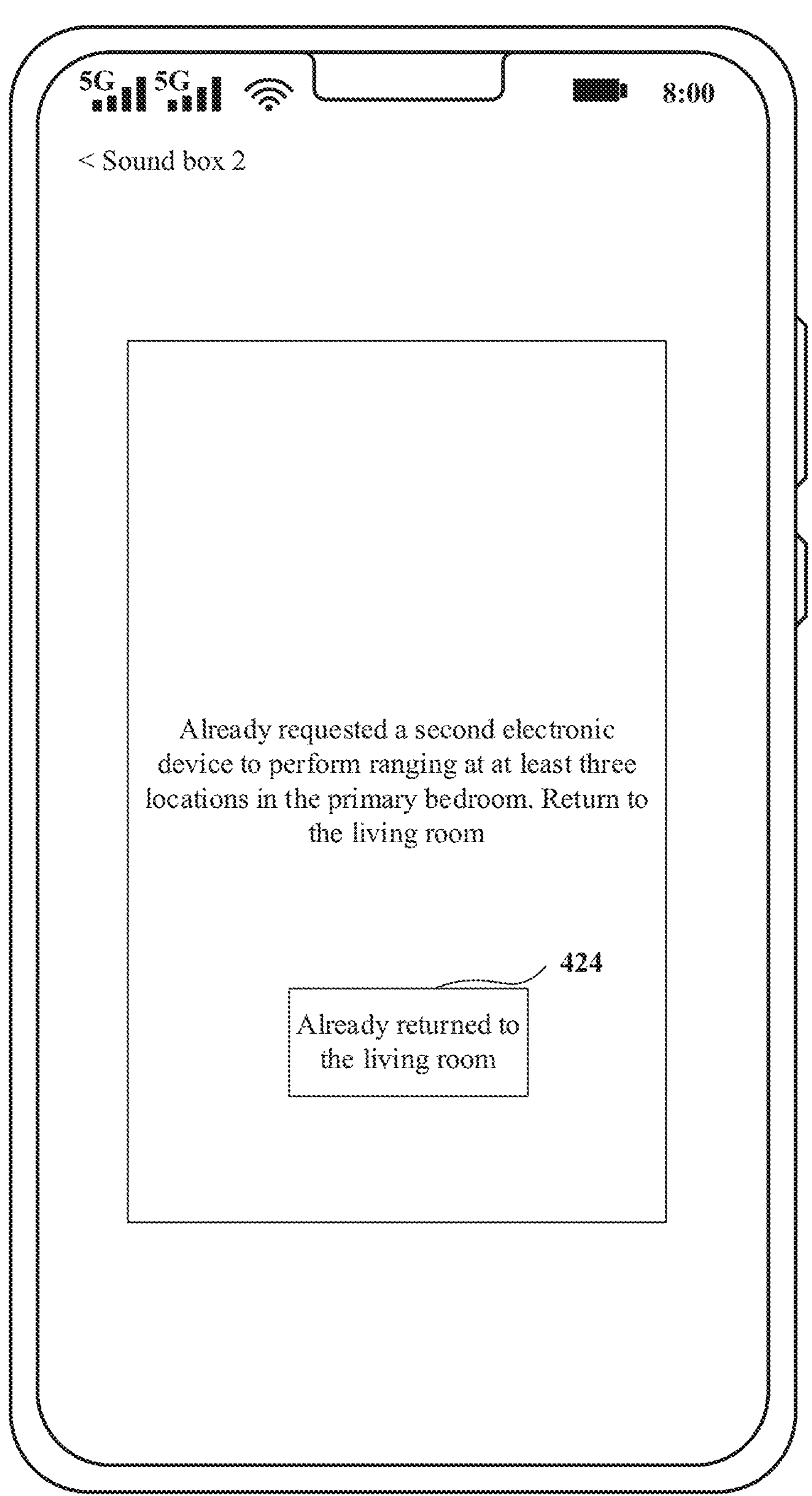
FIG. 4I(2)

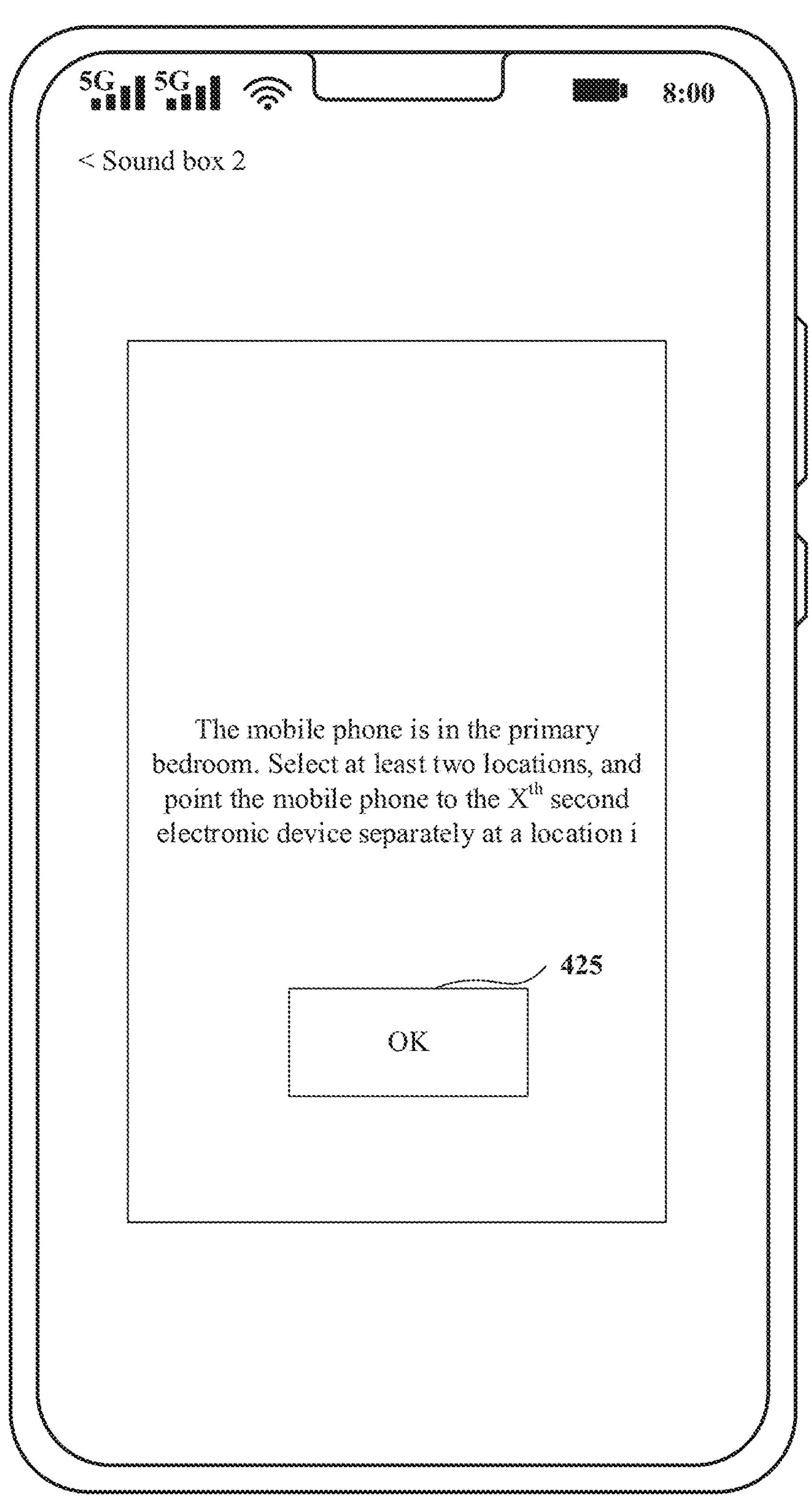
FIG. 4I(3)

METHOD FOR INITIALIZING NEWLY ADDED BASE STATION IN UWB SYSTEM, TERMINAL, AND SYSTEM

CROSS-REFERENCE TO RELATED APPLICATIONS

This application is a national stage U.S. National Stage of International Patent Application No. PCT/CN2021/136906 filed on Dec. 9, 2021, which claims priority to Chinese Patent Application No. 202110131725.4 filed on Jan. 30, 2021. Both of the aforementioned applications are hereby incorporated by reference in their entireties.

TECHNICAL FIELD

This application relates to the field of positioning technologies, and in particular, to a method for initializing a newly added base station in a UWB system, a terminal, and a system.

BACKGROUND

With rapid development of smart home, a space perception capability of a smart device has become an important development direction of the smart home. After the space perception capability of the smart device is enabled, space interaction between a user and a smart device and between smart devices can greatly improve use experience of the smart home.

In the smart home, an indoor positioning system (a UWB system for short) based on an ultra-wideband (ultra-wideband, UWB) technology is generally used to provide the space perception capability for an indoor smart device (for example, a universal remote control or a mobile phone). Different from a conventional communication technology, the UWB technology implements wireless transmission by sending and receiving extremely narrow pulses having a nanosecond or microsecond level or less. Because a pulse time width is extremely short, ultra-bandwidth on a spectrum can be achieved, for example, a used bandwidth is more than 500 MHz. In addition to wireless communication, the UWB technology can also implement positioning in the following step. Specifically, detect a location of a signal pulse, calculate flight time of a signal in the air by combining some positioning algorithms, and multiply the time and a rate (for example, a speed of light) at which the signal is transmitted in the air to obtain a distance between a UWB base station and a UWB tag, to implement positioning.

It should be noted that a UWB signal has poor penetration, has high requirements on line-of-sight propagation, and has poor ranging and positioning accuracy after passing through a wall. Consequently, a UWB base station disposed in a room (for example, a living room) may not be able to provide a positioning service for another room (for example, a bedroom). Therefore, a new UWB base station needs to be disposed in the another room (for example, the bedroom) and a new UWB system needs to be established to measure a location of a UWB tag located in the another room. In other words, different rooms are established with independent UWB systems, different navigation coordinate systems are established in different rooms, and positioning algorithms are quite complex.

SUMMARY

This application provides a method for initializing a newly added base station in a UWB system, and in this method, a unified navigation coordinate system can be established in different rooms, to simplify a positioning algorithm.

To achieve the foregoing objectives, embodiments of this application provide the following technical solutions.

According to a first aspect, a method for initializing a newly added base station in a UWB system is provided. The method includes: When a third electronic device is located at a first location in a first area, the third electronic device sends a first UWB signal to a first electronic device, to measure a first coordinate set corresponding to the first location in a navigation coordinate system. When the third electronic device is located at the first location, the third electronic device further starts IMU measurement of the third electronic device. The third electronic device moves from the first area to a second area. When the third electronic device is located at a second location in the second area, the third electronic device sends a second UWB signal to a second electronic device, to measure a distance between the third electronic device at the second location and the second electronic device, where there are at least three second locations. The third electronic device returns to the first area. When the third electronic device is located at a third location in the first area, the third electronic device sends a third UWB signal to the first electronic device, to measure a second coordinate set corresponding to the third location in the navigation coordinate system. The third electronic device obtains coordinates of the second electronic device in the navigation coordinate system through calculation based on the first coordinate set, data obtained through the IMU measurement, the second coordinate set, and the distance between the third electronic device at the second location and the second electronic device.

The first electronic device is a UWB base station disposed in the first area and is configured to measure a location of a device in the first area, and the second electronic device is a UWB base station disposed in the second area and is configured to measure a location of a device in the second area. The first electronic device determines a navigation coordinate system. According to the method provided in this embodiment of this application, the coordinates of the second electronic device in the navigation coordinate system may be obtained through calculation. To be specific, the second electronic device uses the same navigation coordinate system as the first electronic device, so that a unified navigation coordinate system is established in the first area and the second area, and this helps simplify a positioning algorithm.

In addition, because the unified navigation coordinate system is established between the first area and the second area, when a to-be-detected device switches between the first area and the second area, initial attitude calibration does not need to be performed for a plurality of times, and this simplifies user operations and improves user experience.

In a possible implementation, that the third electronic device obtains coordinates of the second electronic device in the navigation coordinate system through calculation based on the first coordinate set, data obtained through the IMU measurement, the second coordinate set, and the distance between the third electronic device at the second location and the second electronic device specifically includes: The third electronic device obtains, through calculation based on the first coordinate set and the data obtained through the IMU measurement, a third coordinate set corresponding to the third location. The third electronic device calculates, based on the third coordinate set corresponding to the third location and the second coordinate set corresponding to the third location, an offset value between motion data of the third electronic device and the data obtained through the IMU measurement. The third electronic device obtains the motion data of the third electronic device through calculation based on the offset value and the data obtained through the IMU measurement. The third electronic device calculates, based on the motion data of the third electronic device and the first coordinate set corresponding to the first location, a fourth coordinate set corresponding to the second location. The third electronic device obtains the coordinates of the second electronic device in the navigation coordinate system through calculation based on the four coordinates corresponding to the second location and the distance between the third electronic device at the second location and the second electronic device.

To be specific, coordinates of an initial position (namely, the first location) of the third electronic device are measured by using UWB measurement of the first electronic device in the first area, and then a moving track of the third electronic device in the second area is calculated by using an IMU measurement method. Coordinates (that is, the third coordinate set) of an end point position (that is, the third location) may be calculated based on the initial position and the moving track calculated by IMU measurement. Because the data obtained through the IMU measurement accumulates over time, an error increases. Then, the coordinates (that is, the second coordinate set) of the end point position are obtained by using the first electronic device through measurement, and data measured by the first electronic device is more accurate. Therefore, the calculated moving track in the second area is corrected by using an offset between the third coordinate set and the second coordinate set, and accuracy of the calculated coordinates of the second electronic device in the navigation coordinate system can be improved by using the corrected moving track. Further, positioning accuracy of another device measured by the second electronic device is also improved.

In a possible implementation, that the calculating, based on the third coordinate set corresponding to the third location and the second coordinate set corresponding to the third location, an offset value between motion data of the third electronic device and the data obtained through the IMU measurement is specifically: calculating, based on the third coordinate set corresponding to the third location and the second coordinate set corresponding to the third location in a Kalman filtering method, the offset value between the motion data of the third electronic device and the data obtained through the IMU measurement. Therefore, a method for correcting the moving track calculated by the IMU measurement is provided.

In a possible implementation, the method further includes: when the third electronic device enters the second area again, sending a fourth UWB signal to the second electronic device, to measure a distance between the third electronic device and the second electronic device. The third electronic device calculates coordinates of a current location of the third electronic device in the navigation coordinate system based on the distance between the third electronic device and the second electronic device and the coordinates of the second electronic device in the navigation coordinate system. To be specific, based on the moving track (that is, location coordinates of the third electronic device at each moment in the second area can be obtained through calculation) of the third electronic device in the second area, and distances between the third electronic device and the second electronic device when the third electronic device is at at least three locations, so that the coordinates of the second electronic device may be calculated.

In a possible implementation, the method further includes: when the third electronic device is at the third location, closing or suspending the IMU measurement of the third electronic device. It can be learned that the IMU measurement is closed in time, and power consumption of the third electronic device is reduced.

In a possible implementation, the second electronic device and the first electronic device have different communication addresses.

In a possible implementation, that the second electronic device and the first electronic device have different communication addresses is specifically: The second electronic device and the first electronic device have different communication timeslots or pseudo random binary sequences.

In other words, the first electronic device and the second electronic device may use a time division multiple access (time division multiple access, TDMA) or a code division multiple access (code division multiple access, CDMA) communication technology to receive a UWB signal sent by the third electronic device. Therefore, different communication timeslots or pseudo random binary sequences are uniformly allocated to the first electronic device and the second electronic device. In this case, each second electronic device in the second area receives, in a respective allocated communication timeslot, a UWB signal sent to the second electronic device, or parses and sends, by using a respective pseudo random binary sequence, a UWB signal sent to the second electronic device.

In a possible implementation, when the third electronic device is located at the first location in the first area, before the third electronic device sends the first UWB signal to the first electronic device, to measure the first coordinate set corresponding to the first location in the navigation coordinate system, the method further includes: The third electronic device receives a first operation of a user, where the first operation is used to indicate to initialize the second electronic device. The third electronic device sends a first prompt in response to receiving the first operation, where the first prompt is used to prompt the user to carry the third electronic device into the first area. Therefore, a prompt method is provided, and is used to notify the user of how to operate.

In a possible implementation, before the third electronic device moves from the first area to a second area, the method further includes: The third electronic device sends a second prompt, where the second prompt is used to prompt the user to carry the third electronic device into the second area. Therefore, a prompt method is provided, and is used to notify the user how to operate.

In a possible implementation, before the third electronic device returns to the first area, the method further includes: The third electronic device sends a third prompt, where the third prompt is used to prompt the user to carry the third electronic device back to the first area. Therefore, a prompt method is provided, and is used to notify the user how to operate.

In a possible implementation, the navigation coordinate system is determined based on the first electronic device. The navigation coordinate system is a navigation coordinate system of a UWB system formed by the first electronic device.

In a possible implementation, there are at least three first electronic devices, and each first electronic device includes one UWB antenna; or there is one first electronic device, and the first electronic device includes at least three UWB antennas.

In a possible implementation, there are at least three second electronic devices, and each second electronic device includes one UWB antenna; or there is one second electronic device, and the second electronic device includes at least three UWB antennas.

According to a second aspect, a method for initializing a newly added base station in a UWB system is provided. The method includes: When a third electronic device is located at a first location in a first area, the third electronic device sends a first UWB signal to a first electronic device, to measure a first coordinate set corresponding to the first location in a navigation coordinate system. When the third electronic device is located at the first location, the third electronic device starts IMU measurement of the third electronic device. The third electronic device moves from the first area to a second area. When the third electronic device is located at a second location in the second area, the third electronic device obtains attitude information of the third electronic device when the third electronic device points to the second electronic device, where there are at least two second locations. The third electronic device returns to the first area. When the third electronic device is located at a third location in the first area, the third electronic device sends a third UWB signal to the first electronic device, to measure a second coordinate set corresponding to the third location in the navigation coordinate system. The third electronic device calculates coordinates of the second electronic device in the navigation coordinate system based on the first coordinate set, data obtained through the IMU measurement, the second coordinate set, and the attitude information of the third electronic device when the third electronic device points to the second electronic device.

The first electronic device is a UWB base station disposed in the first area and is configured to measure a location of a device in the first area, and the second electronic device is a UWB base station disposed in the second area and is configured to measure a device in the second area. The first electronic device determines a navigation coordinate system. According to the method provided in this embodiment of this application, the coordinates of the second electronic device in the navigation coordinate system may be obtained through calculation. To be specific, the second electronic device uses the same navigation coordinate system as the first electronic device, so that a unified navigation coordinate system is established in the first area and the second area, and this helps simplify a positioning algorithm.

In addition, because the unified navigation coordinate system is established between the first area and the second area, when a to-be-detected device switches between the first area and the second area, initial attitude calibration does not need to be performed for a plurality of times, and this simplifies user operations and provides user experience.

In a possible implementation, that the third electronic device points to the second electronic device includes; a preset axis of a carrier coordinate system of the third electronic device points to the second electronic device.

For example, the third electronic device is a mobile phone. Based on habits of using mobile phones of most users, an orientation (or a direction of the mobile phone) may be defined as a direction parallel to a long side of the mobile phone and pointing along the bottom of the mobile phone to the top. Therefore, the orientation of the mobile phone may be referred to as a top orientation of the mobile phone. Generally, the top of the mobile phone is a body part on which hardware such as a front-facing camera, an infrared transmitter, an earpiece, a light sensor, or a distance sensor is installed. The bottom of the mobile phone is a body part with a microphone and a speaker.

In a possible implementation, that the third electronic device calculates coordinates of the second electronic device in the navigation coordinate system based on the first coordinate set, data obtained through the IMU measurement, the second coordinate set, and the attitude information of the third electronic device when the third electronic device points to the second electronic device specifically includes: The third electronic device obtains, through calculation based on the first coordinate set and the data obtained through the IMU measurement, a third coordinate set corresponding to the third location. The third electronic device calculates, based on the third coordinate set corresponding to the third location and the second coordinate set corresponding to the third location, an offset value between motion data of the third electronic device and the data obtained through the IMU measurement. The third electronic device obtains the motion data of the third electronic device through calculation based on the offset value and the data obtained through the IMU measurement. The third electronic device calculates, based on the motion data of the third electronic device and the first coordinate set corresponding to the first location, a fourth coordinate set corresponding to the second location. The third electronic device obtains the coordinates of the second electronic device in the navigation coordinate system through calculation based on the four coordinates corresponding to the second location and the attitude information of the third electronic device when the third electronic device points to the second electronic device.

In other words, when the third electronic device is located in the second area, the coordinates of the second electronic device may be calculated based on the attitude information of the third electronic device when the third electronic device points to the second electronic device and coordinates of the third electronic device in the navigation coordinate system of the third electronic device when the third electronic device points to the second electronic device. Therefore, another method of calculating the coordinates of the second electronic device is provided.

In a possible implementation, that the calculating, based on the third coordinate set corresponding to the third location and the second coordinate set corresponding to the third location, an offset value between motion data of the third electronic device and the data obtained through the IMU measurement is specifically: calculating, based on the third coordinate set corresponding to the third location and the second coordinate set corresponding to the third location in a Kalman filtering method, an offset value between motion data of the third electronic device and the data obtained through the IMU measurement.

In a possible implementation, the method further includes: when the third electronic device enters the second area again, sending a fourth UWB signal to the second electronic device, to measure a distance between the third electronic device and the second electronic device. The third electronic device calculates coordinates of a current location of the third electronic device in the navigation coordinate system based on the distance between the third electronic device and the second electronic device and the coordinates of the second electronic device in the navigation coordinate system.

In a possible implementation, the method further includes: when the third electronic device is at the third location, closing or suspending the IMU measurement of the third electronic device.

In a possible implementation, the second electronic device and the first electronic device have different communication addresses.

In a possible implementation, that the second electronic device and the first electronic device have different communication addresses is specifically: The second electronic device and the first electronic device have different communication timeslots or pseudo random binary sequences.

In a possible implementation, when the third electronic device is located at the first location in the first area, before the third electronic device sends the first UWB signal to the first electronic device, to measure the first coordinate set corresponding to the first location in the navigation coordinate system, the method further includes: The third electronic device receives a first operation of a user, where the first operation is used to indicate to initialize the second electronic device. The third electronic device sends a first prompt in response to receiving the first operation, where the first prompt is used to prompt the user to carry the third electronic device into the first area.

In a possible implementation, before the third electronic device moves from the first area to a second area, the method further includes: The third electronic device sends a second prompt, where the second prompt is used to prompt the user to carry the third electronic device into the second area.

In a possible implementation, before the third electronic device returns to the first area, the method further includes: The third electronic device sends a third prompt, where the third prompt is used to prompt the user to carry the third electronic device back to the first area.

In a possible implementation, the navigation coordinate system is determined based on the first electronic device.

In a possible implementation, there are at least three first electronic devices, and each first electronic device includes one UWB antenna; or there is one first electronic device, and the first electronic device includes at least three UWB antennas.

In a possible implementation, there are at least three second electronic devices, and each second electronic device includes one UWB antenna; or there is one second electronic device, and the second electronic device includes at least three UWB antennas.

According to a third aspect, a third electronic device is provided, including a processor, a memory, a UWB module, and an IMU module. The memory, the UWB module, and the IMU module are coupled to the processor. The memory is configured to store computer program code. The computer program code includes computer instructions, and when the processor reads the computer instructions from the memory, the third electronic device is enabled to perform the method in any one of the first aspect and the possible implementations of the first aspect, and perform the method in any one of the second aspect and the possible implementations of the second aspect.

According to a fourth aspect, an apparatus is provided. The apparatus is included in a third electronic device, and the apparatus has a function of implementing behavior of the third electronic device in any method in the foregoing aspects and the possible implementations of the foregoing aspects. The function may be implemented by hardware, or may be implemented by hardware executing corresponding software. The hardware or the software includes at least one module or unit corresponding to the foregoing function, for example, a communication module or unit, a measurement module or unit, and a compute module or unit.

According to a fifth aspect, a computer-readable storage medium is provided, including computer instructions. When the computer instructions are run on a third electronic device, the third electronic device is enabled to perform the method in any one of the first aspect or the possible implementations of the first aspect: and perform the method in any one of the second aspect and the possible implementations of the second aspect.

According to a sixth aspect, a computer program product is provided. When the computer program product runs on a computer, the computer is enabled to perform the method in any one of the first aspect and the possible implementations of the first aspect, and perform the method in any one of the second aspect and the possible implementations of the second aspect.

According to a seventh aspect, a chip system is provided, including a processor. When the processor executes instructions, the processor performs the method in any one of the first aspect and the possible implementations of the first aspect, and performs the method in any one of the second aspect and the possible implementations of the second aspect.

According to an eighth aspect, a system is provided, including at least one first electronic device, at least one second electronic device, and at least one third electronic device. The at least one first electronic device is disposed in a first area, the at least one second electronic device is disposed in a second area, and the third electronic device performs the method in any one of the first aspect and the possible implementations of the first aspect, and performs the method in any one of the second aspect and the possible implementations of the second aspect.

In a possible implementation, there are at least three first electronic devices, and each first electronic device includes one UWB antenna; or there is one first electronic device, and the first electronic device includes at least three UWB antennas.

In a possible implementation, there are at least three second electronic devices, and each second electronic device includes one UWB antenna; or there is one second electronic device, and the second electronic device includes at least three UWB antennas.

It may be understood that beneficial effects that can be achieved by the third electronic device according to the third aspect, the apparatus according to the fourth aspect, the computer storage medium according to the fifth aspect, the computer program product according to the sixth aspect, the chip system according to the seventh aspect, and the system according to the eighth aspect provided, refer to the beneficial effects in any one of the first aspect, the second aspect, and the possible design manners of the first aspect, and the second aspect. Details are not described herein again.

BRIEF DESCRIPTION OF DRAWINGS

FIG. 4A-1 and FIG. 4A-2 are a flowchart of a method for initializing a newly added base station in a UWB system according to an embodiment of this application;

FIG. 4B(1) and FIG. 4B(2) are schematic diagrams of some interfaces of a third electronic device according to an embodiment of this application;

FIG. 4C(1) and FIG. 4C(2) are schematic diagrams of some other interfaces of a third electronic device according to an embodiment of this application:

FIG. 4D(1) and FIG. 4D(2) are schematic diagrams of some other interfaces of a third electronic device according to an embodiment of this application:

FIG. 4F(1) and FIG. 4F(2) are schematic diagrams of some other interfaces of a third electronic device according to an embodiment of this application;

FIG. 4G(1) and FIG. 4G(2) are schematic diagrams of some other interfaces of a third electronic device according to an embodiment of this application;

FIG. 4H(1), FIG. 4H(2) and FIG. 4H(3) are schematic diagrams of some other interfaces of a third electronic device according to an embodiment of this application;

FIG. 4I(1), FIG. 4I(2) and FIG. 4I(3) are schematic diagrams of some other interfaces of a third electronic device according to an embodiment of this application:

DESCRIPTION OF EMBODIMENTS

Figure 1:
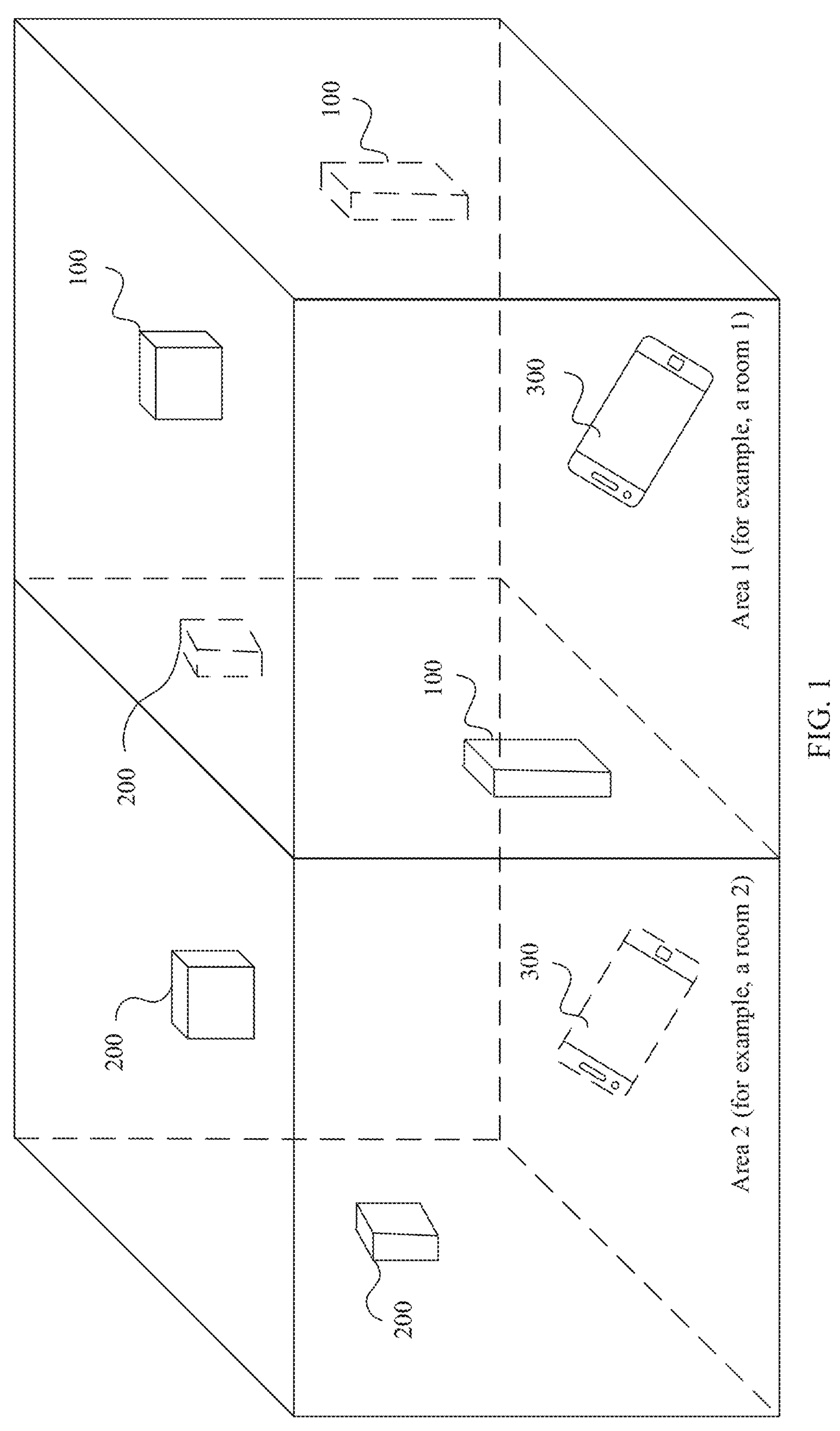
FIG. 1 is a schematic diagram of an architecture of an application scenario according to an embodiment of this application.

In descriptions of embodiments of this application, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word like "example" or "for example" is intended to present a relative concept in a specific manner.

The following two solutions may be used to solve problems of UWB positioning in different rooms. However, these solutions have different problems as follows:

Solution 1: First, one or more UWB base stations are disposed in a room 1, and a navigation coordinate system is established, so that a location of a UWB tag located in the room 1 can be measured. Then, one or more UWB base stations are disposed in a room 2. Coordinates of the UWB base station in the room 2 in the navigation coordinate system may be obtained through measurement by using the UWB base station in the room 1. Finally, a location of a UWB tag located in the room 2 is measured by using the UWB base station in the room 2.

When a location of the base station in the room 2 is measured by using the base station in the room 1, strength of UWB signals propagated in the room 1 and the room 2 is weakened due to blockage of a wall between the room 1 and the room 2. In addition, a spatial propagation delay of the UWB signals after the UWB signals pass through the wall also increases, and this seriously affects positioning accuracy of the base station in the room 2.

Solution 2: First, one or more UWB base stations are disposed in a room 1, and a navigation coordinate system 1 is established, so that a location of a UWB tag located in the room 1 can be measured. Then, one or more UWB base stations are disposed in a room 2, and a navigation coordinate system 2 is established, to measure a location of a UWB tag located in the room 2. In other words, an independent UWB system is disposed in each room, and different navigation coordinate systems are established in different rooms.

In this case, for a UWB tag moving in different rooms, the UWB tag need to store information (for example, coordinates of UWB base stations in different navigation coordinate systems) of the navigation coordinate systems in the different rooms. When positioning is performed on the UWB tag, the UWB tag further needs to determine, based on a specific condition of a received UWB signal, a navigation coordinate system in which a UWB base station sends the UWB signal. Then, calculation is performed by using coordinates of the corresponding UWB base station, and coordinates of the UWB tag in the navigation coordinate system are output. It can be learned that positioning algorithms are quite complex. In addition, when the UWB tag switches to another navigation coordinate system each time, an initial attitude of the UWB tag needs to be re-calibrated, resulting in poor user experience.

Therefore, an embodiment of this application provides a method for initializing a newly added base station in a UWB system, to establish a unified navigation coordinate system in different rooms. This reduces a storage load of a UWB tag, and reduces algorithms used when the UWB tag is positioned in different rooms. It also helps ensure positioning accuracy of the UWB tag in different rooms. In addition, a user does not need to perform a plurality of times of initial attitude calibrations on the UWB tag, and this improves user experience.

The following describes in detail technical solutions provided in embodiments of this application with reference to the accompanying drawings.

FIG. 1 is a schematic diagram of an architecture of an application scenario according to an embodiment of this application. One or more first electronic devices 100 having a UWB signal transceiver apparatus are disposed in an area 1 (for example, a room 1), and a navigation coordinate system(referred to as a U system for short) has been established for the first electronic device 100. The one or more first electronic devices 100 may be configured to measure a location of a UWB tag located in the area 1 under the U system. In some examples, the foregoing UWB signal transceiver apparatus may be a multi-antenna architecture (for example, a three-antenna architecture or a four-antenna architecture), that is, the foregoing UWB signal transceiver apparatus includes at least a plurality of antennas configured to send and receive a UWB signal. In this case, one first electronic device 100 may be disposed in the area 1, to implement positioning of the UWB tag located in the area 1. In some other examples, the foregoing UWB signal transceiver apparatus may be a single-antenna architecture, that is, includes one antenna configured to send and receive a UWB signal. In this case, according to a triangulation-based positioning principle, at least three first electronic devices 100 with the single-antenna architecture need to be disposed in the area 1, to implement positioning of the UWB tag located in the area 1. In still some examples, both a first electronic device 100 with the single-antenna architecture and a first electronic device 100 with the multi-antenna architecture may be disposed in the area 1. In conclusion, in this embodiment of this application, an antenna architecture of the first electronic device 100 and a quantity of first electronic devices 100 disposed in the area 1 are not limited.

An area 2 (for example, a room 2) is a newly added positioning area. Similarly, one or more second electronic devices 200 having a UWB signal transceiver apparatus may be disposed in the area 2 (for example, the room 2). The one or more second electronic devices 200 may be configured to measure a location of a UWB tag located in the area 2. Similar to the first electronic device 100 in the area 1, the UWB signal transceiver apparatus of the second electronic device 200 may be the multi-antenna architecture, or may be the single-antenna architecture. When the second electronic device 200 is the multi-antenna architecture, there may be one second electronic device 200. When the second electronic device 200 is the single-antenna architecture, there are at least three second electronic devices 200. For related content, refer to the foregoing description of the first electronic device 100. In other words, in this embodiment of this application, an antenna architecture of the second electronic device 200 and a quantity of second electronic devices 200 disposed in the area 2 are not limited. In addition, a structure of the second electronic device 200 may be the same as or different from that of the first electronic device 100. This is not limited in this embodiment of this application.

In this embodiment of this application, the system architecture of the application scenario shown in FIG. 1 further includes a third electronic device 300, and the third electronic device 300 can move between the area 1 and the area 2. The third electronic device 300 may include an inertial measurement unit (inertial measurement unit, IMU), configured to measure a moving track of the third electronic device 300.

When the second electronic device 200 in the area 2 is initialized, the first electronic device 100 may be used to measure a start position of the third electronic device 300 in the area 1. Then, the third electronic device 300 may be moved from the area 1 to the area 2 and back to the area 1. In an entire movement process of the third electronic device 300, the moving track of the third electronic device 300 is obtained through IMU measurement, and a distance between the third electronic device 300 and the second electronic device 200 in the area 2 is measured. When the third electronic device 300 returns to the area 2, the first electronic device 100 is used again to measure an end point position of the third electronic device 300 in the area 1. It should be noted that the moving track of the third electronic device 300 obtained through the IMU measurement has a specific actual time-accumulated error, and a positioning error after continuous running is large. However, continuous positioning accuracy of the third electronic device 300 measured by the first electronic device 100 is higher. Therefore, the first electronic device 100 may subsequently be used to measure the end point position at which the third electronic device 300 returns to the area 1. Then, offset correction is performed on the moving track of the third electronic device 300 obtained through the IMU measurement by using the end point position measured by the first electronic device 100. A location of the second electronic device 200 in the area 2, that is, coordinates of the second electronic device 200 in the navigation coordinate system, is calculated by using the moving track after the offset correction and the measured distance between the third electronic device 300 and the second electronic device 200 in the area 2. After the coordinates of the second electronic device 200 are obtained through calculation, the second electronic device 200 may be used to measure a location of another device in the area 2. It should be noted that in the entire process, a same navigation coordinate system is used, that is, an effect of unified coordinate systems of the area 2 and the area 1 is implemented. A specific implementation solution is described in detail below.

For example, the first electronic device 100 may be specifically a UWB base station, a smart sound box, a smart television, an air purifier, a humidifier, or a smart lamp (for example, a ceiling lamp, a desk lamp, an aromatherapy lamp), a desktop computer, a router, a smart socket, a water dispenser, a refrigerator, a smart switch, an intelligent lock, a customer premise equipment (Customer Premise Equipment, CPE), a tablet computer, a mobile phone, and the like. A specific form of the first electronic device 100 is not limited in this application.

Figures 2, 3:
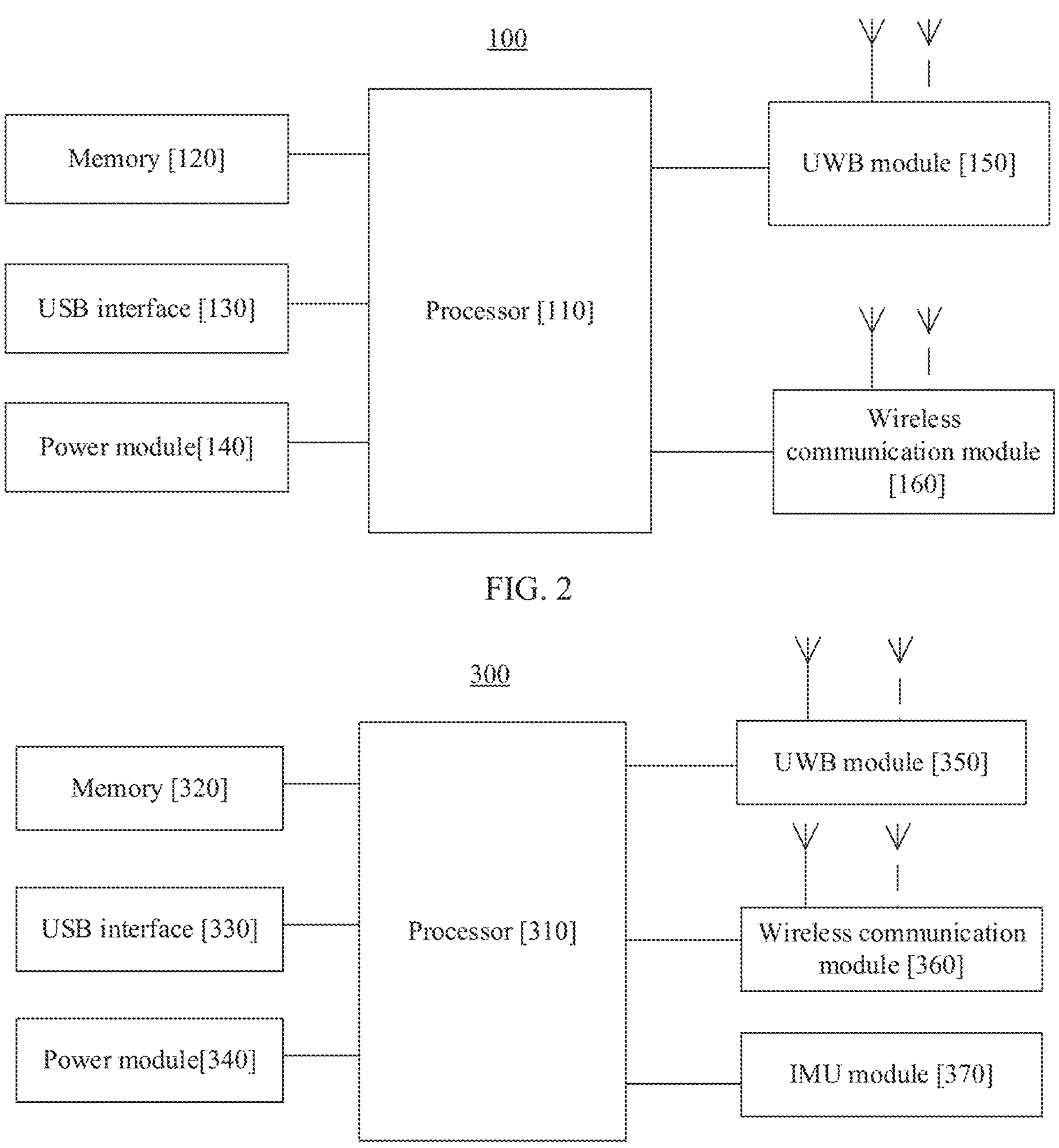
FIG. 2 is a schematic diagram of a structure of a first electronic device according to an embodiment of this application.
FIG. 3 is a schematic diagram of a structure of a third electronic device according to an embodiment of this application.

FIG. 2 is a schematic diagram of a structure of a first electronic device 100.

As shown in FIG. 2, the first electronic device 100 may include a processor 110, a memory 120, a universal serial bus (universal serial bus. USB) interface 130, a power module 140, a UWB module 150, a wireless communication module 160, and the like.

It may be understood that the structure shown in this embodiment of the present invention does not constitute a specific limitation on the first electronic device 100. In some other embodiments of this application, the first electronic device 100 may include more or fewer components than those shown in the figure, or combine some components, or split some components, or have different component arrangements. The illustrated components may be implemented in hardware, software, or a combination of software and hardware. In addition, an interface connection relationship between the modules shown in this embodiment of the present invention is merely an example for description, and does not constitute a limitation on the structure of the first electronic device 100. In some other embodiments of this application, the first electronic device 100 may alternatively use different interface connection manners different from that in FIG. 2, or a combination of a plurality of interface connection manners.

The processor 110 may include one or more processing units. For example, the processor 110 may include an application processor, a modem processor, a controller, a baseband processor, and the like. Different processing units may be independent components, or may be integrated into one or more processors. For example, the processor 210 is a central processing unit (central processing unit, CPU), or an application-specific integrated circuit (application-specific integrated circuit. ASIC), or is configured as one or more integrated circuits for implementing embodiments of this application, for example, one or more microprocessors (digital signal processor, DSP) or one or more field programmable gate arrays (field programmable gate arrays. FPGAs).

The controller may generate an operation control signal based on an instruction operation code and a time sequence signal, to complete control of instruction reading and instruction execution.

A memory may be further disposed in the processor 110, configured to store instructions and data. In some embodiments, the memory in the processor 110 is a cache memory. The memory may store instructions or data that is just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

The memory 120 may be configured to store computer-executable program code. The executable program code includes instructions. For example, the memory 120 may further store data processed by the processor 110, for example, a location of a UWB tag 200 obtained through calculation and an attitude. In addition, the memory 120 may include a high-speed random access memory, and may further include a non-volatile memory, for example, at least one magnetic disk storage device, a flash storage device, or a universal flash storage (universal flash storage, UFS). The processor 110 runs instructions stored in the memory 120 and/or instructions stored in the memory disposed in the processor, to perform various function applications and data processing of the first electronic device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module. SIM) interface, and/or a universal serial bus (universal serial bus, USB) interface 130.

The USB interface 130 is an interface that conforms to a USB standard specification, and may be specifically a mini USB interface, a micro USB interface, a USB type-C interface, or the like. The USB interface 130 may be configured to connect to a charger to charge the first electronic device 100, or may be configured to transmit data between the first electronic device 100 and a peripheral device.

The power module 140 is configured to supply power to each component of the first electronic device 100, for example, the processor 210 and a memory 220.

A wireless communication function of the first electronic device 100 may be implemented through the UWB module 150, the wireless communication module 160, the modem processor, the baseband processor, and the like.

The modem processor may include a modulator and a demodulator. The modulator is configured to modulate a to-be-sent low-frequency baseband signal into a medium-high frequency signal. The demodulator is configured to demodulate a received electromagnetic wave signal into the low-frequency baseband signal. Then, the demodulator transmits the demodulated low-frequency baseband signal to the baseband processor for processing. The low-frequency baseband signal is processed by the baseband processor and then transferred to the application processor. In some embodiments, the modem processor may be an independent component. In some other embodiments, the modem processor may be independent of the processor 110, and is disposed in a same component as the UWB module 150 or another functional module.

The UWB module 150, that is, a UWB signal transceiver apparatus, may provide a UWB technology-based wireless communication solution applied to the first electronic device 100. Different from a conventional communication technology, the UWB technology implements wireless transmission by sending and receiving extremely narrow pulses having a nanosecond or microsecond level or less. Because a pulse time width is extremely short, ultra-bandwidth on a spectrum can be achieved, for example, a used bandwidth is more than 500 MHz. In addition to wireless communication, the UWB technology can also realize positioning, specifically, by detecting a position of a signal pulse and combining some positioning algorithms to calculate flight time of a signal in the air, and a distance between the UWB tag 200 and the first electronic device 100 is obtained by multiplying the time by a rate (for example, a speed of light) at which the signal is transmitted in the air. In addition, in this application, the first electronic device 100 may further determine, based on phase differences of different antennas achieved by the UWB signal sent by the UWB tag 200, a direction of the UWB tag 200 relative to the first electronic device 100. Therefore, a goal of positioning function is achieved, and the accuracy can reach a centimeter-level accuracy positioning.

The UWB module 150 may be one or more components that integrate at least one communication processing module. The UWB module 150 receives an electromagnetic wave through an antenna, performs frequency modulation and filtering processing on the electromagnetic wave signal, and sends a processed signal to the processor 110. The UWB module 150 may further receive a to-be-sent signal from the processor 110, perform frequency modulation and amplification on the signal, and convert the signal into an electromagnetic wave for radiation through the antenna. The UWB module 150 may include one or more antennas configured to send a UWB signal, or the UWB module 150 is connected to one or more antennas configured to send a UWB signal.

Optionally, the first electronic device 100 may further include the wireless communication module 160, to provide a wireless communication solution that is applied to the first electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna.

For a specific form/structure of the second electronic device 200, refer to the description of the specific form/structure of the first electronic device 100. Details are not described herein again. In addition, the specific form/structure of the second electronic device 200 may be the same as or different from that of the first electronic device 100.

For example, the third electronic device 300 may be specifically a UWB tag, a mobile phone, a remote control, a wearable electronic device (smartwatch, smart band, VR glasses, or the like), a tablet computer, a personal digital assistant (personal digital assistant, PDA), a handle, an air mouse, a robotic vacuum cleaner, and the like. A specific form of the third electronic device 300 is not limited in this application.

FIG. 3 is a schematic diagram of a structure of a third electronic device 300.

As shown in FIG. 3, the third electronic device 300 may include a processor 310, a memory 320, a universal serial bus (universal serial bus, USB) interface 330, a power module 340, a UWB module 350, a wireless communication module 360, an IMU module 370, and the like.

It may be understood that the structure shown in this embodiment of the present invention does not constitute a specific limitation on the third electronic device 300. In some other embodiments of this application, the third electronic device 300 may include more or fewer components than those shown in the figure, or some components may be combined, or some components may be split, or different component arrangements may be used. The illustrated components may be implemented in hardware, software, or a combination of software and hardware. In addition, an interface connection relationship between the modules shown in this embodiment of the present invention is merely an example for description, and does not constitute a limitation on the structure of the third electronic device 300. In some other embodiments of this application, the third electronic device 300 may alternatively use different interface connection manners different from that in FIG. 3, or a combination of a plurality of interface connection manners.

The processor 310 may include one or more processing units. For example, the processor 310 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU), or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 310, configured to store instructions and data. In some embodiments, the memory in the processor 310 is a cache memory. The memory may store instructions or data that is just used or cyclically used by the processor 310. If the processor 310 needs to use the instructions or the data again, the processor 310 may directly invoke the instructions or the data from the memory. This avoids repeated access, reduces waiting time of the processor 310, and improves system efficiency.

The memory 320 may be configured to store computer-executable program code. The executable program code includes instructions. The memory 320 may include a program storage area and a data storage area. The program storage area may store an operating system, an application required by at least one function (for example, a sound playing function or an image playing function), and the like. The data storage area may store data (such as audio data and a phone book) created in a process of using the electronic device 100. In addition, the memory 320 may include a high-speed random access memory, and may further include a non-volatile memory, for example, at least one magnetic disk storage device, a flash storage device, or a universal flash storage (universal flash storage, UFS). The processor 110 runs instructions stored in the memory 320 and/or instructions stored in the memory disposed in the processor, to perform various function applications and data processing of the electronic device 100.

The USB interface 330 is an interface that conforms to a USB standard specification, and may be specifically a mini USB interface, a micro USB interface, a USB type-C interface, or the like. The USB interface 330 may be configured to connect to a charger to charge the electronic device 100, or may be configured to transmit data between the electronic device 100 and a peripheral device. It can also be used to connect to a headset and play audio through the headset. The interface may be further configured to connect to another electronic device like an AR device.

It may be understood that an interface connection relationship between the modules that is shown in this embodiment of the present disclosure is merely an example for description, and does not constitute a limitation on a structure of the electronic device 100. In some other embodiments of this application, the electronic device 100 may alternatively use different interface connection manners or a combination of a plurality of interface connection manners in the foregoing embodiment.

The power module 340 is configured to supply power to each component of the third electronic device 300, for example, the processor 310 and the memory 320.

The UWB module 350, that is, a UWB signal transceiver apparatus, may provide a UWB technology-based wireless communication solution applied to the third electronic device 300. The UWB module 350 includes an antenna module. The antenna module may include one or more antennas, configured to send and receive a UWB signal, so that the second electronic device 200 determines a distance between the third electronic device 300 and the first electronic device 100 and a direction of the third electronic device 300 relative to the first electronic device 100.

The UWB module 350 may be one or more components that integrate at least one communication processing module. The UWB module 350 receives an electromagnetic wave through an antenna, performs frequency modulation and filtering processing on the electromagnetic wave signal, and sends a processed signal to the processor 110. The UWB module 350 may further receive a to-be-sent signal from the processor 110, perform frequency modulation and amplification on the signal, and convert the signal into an electromagnetic wave for radiation through the antenna. The UWB module 350 may include one or more antennas configured to send a UWB signal, or the UWB module 350 is connected to one or more antennas configured to send a UWB signal.

Optionally, the third electronic device 300 may further include a wireless communication module 360, to provide a wireless communication solution that is applied to the first electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system. GNSS), frequency modulation (frequency modulation, FM), a near field communication (near field communication, NFC) technology, an infrared (infrared, IR) technology, or the like. The wireless communication module 360 may be one or more components that integrate at least one communication processing module. The wireless communication module 360 receives an electromagnetic wave through the antenna, performs frequency modulation and filtering processing on the electromagnetic wave signal, and sends a processed signal to the processor 110. The wireless communication module 360 may further receive a to-be-sent signal from the processor 110, perform frequency modulation and amplification on the signal, and convert the signal into an electromagnetic wave for radiation through the antenna.

The IMU module 370 is configured to measure motion data of the third electronic device 300, for example, acceleration or angular velocity. The IMU module 370 may include a combination unit including three accelerometers and three gyroscopes, and the accelerometers and the gyroscopes are installed on measurement axes perpendicular to each other. The accelerometer may detect acceleration of the third electronic device 300 on three axes in a carrier coordinate system (b system for short), and the gyroscope may detect the angular velocity of the b system around three axes in a geographical coordinate system (n system for short). Then, an attitude of the third electronic device 300 may be obtained by solving based on the motion data that is of the third electronic device 300 and that is measured by the IMU module 370. Further, a moving track of the third electronic device 300 may be obtained through calculation based on an attitude change of the third electronic device 300 and the acceleration measured by the IMU module 370. In some examples, more accurate and continuous positioning and navigation may be provided for the third electronic device 300 with reference to locations that are of the third electronic device 300 and that are measured by the first electronic device 100 or the second electronic device 200 at some moments.

This embodiment of this application may be applied to the communication system shown in FIG. 1. The first electronic device 100 and the second electronic device 200 may have a structure shown in FIG. 2, and the third electronic device 300 may have a structure shown in FIG. 3. The following describes in detail the technical solutions provided in embodiments of this application with reference to the accompanying drawings.

Figures 1, 4A:
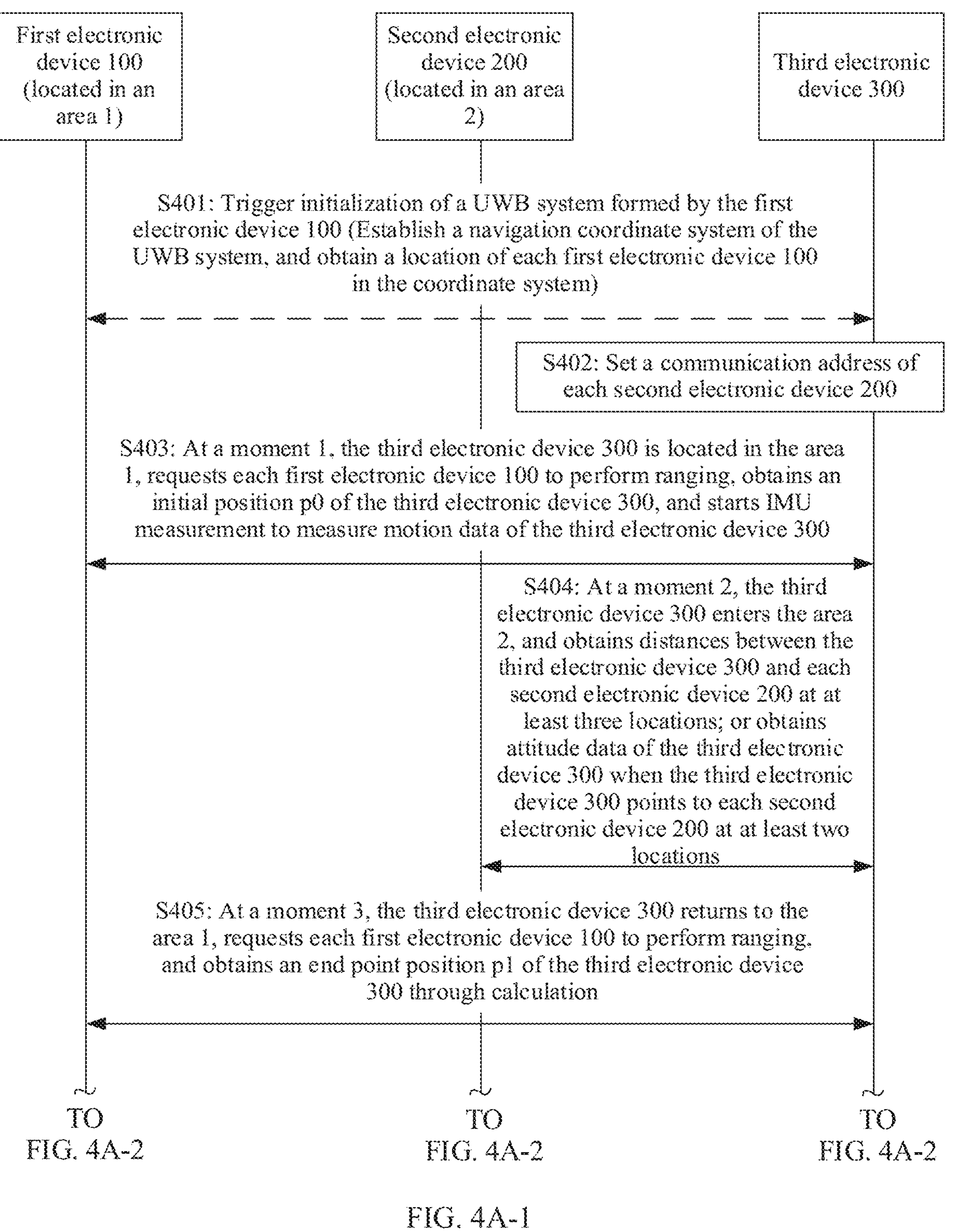
Figures 2, 4A:
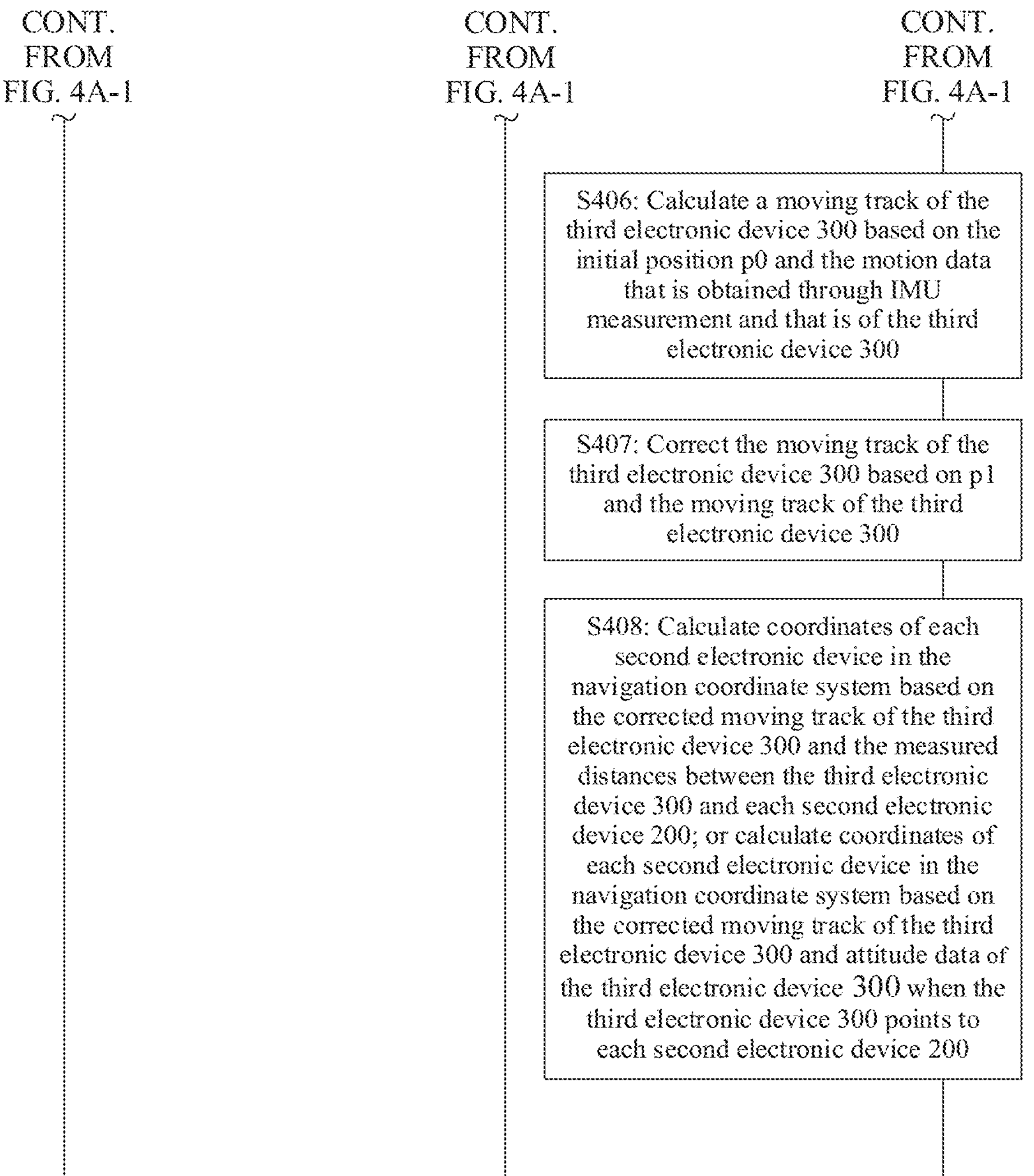

As shown in FIG. 4A-1 and FIG. 4A-2, FIG. 4A-1 and FIG. 4A-2 are a schematic flowchart of a method for initializing a newly added base station in a UWB system according to an embodiment of this application. The method includes the following steps.

S401: A third electronic device triggers initialization of a UWB system formed by a first electronic device 100.

For example, one or more first electronic devices 100 are disposed in an area 1, and the one or more first electronic devices 100 may constitute a positioning system, configured to measure a location of a UWB tag located in the area 1. The area 1 may be a closed or semi-closed space, for example, a room 1, or the area 1 may be an open space.

In an example, if the first electronic device 100 is a single-antenna architecture, at least three first electronic devices 100 need to be disposed in the area 1. In the following, an example in which three first electronic devices 100 are disposed in the area 1 is used for description. First, according to a preset arrangement rule (for example, a first electronic device A, a first electronic device B, and a first electronic device C are disposed in the area 1, where a connection line between the first electronic device A and the first electronic device B is parallel to a horizontal plane, and a connection line between a second electronic device A and the first electronic device B is parallel to a plumb line), three first electronic devices 100 are installed, and a navigation coordinate system of the first electronic device 100 and coordinates of each first electronic device 100 in the coordinate system are determined.

In a specific implementation, the first electronic device 100 in the area 1 may be set by using a control device (for example, a third electronic device 300) on which a home application is installed. For example, the control device is a mobile phone. As shown in FIG. 4B(1), FIG. 4B(1) shows a home screen of the home application. The home screen includes registered and networked home devices (for example, a television 1 and a sound box 1). A user may add a new device by using an add control 410. For a specific process of adding a new device, refer to the conventional technology. Details are not described herein again. As shown in FIG. 4B(2), registration and network configuration of a sound box 2 are completed. The television 1, the sound box 1, and the sound box 2 are all located in a living room (the area 1). Herein, a process of establishing a UWB system including the television 1, the sound box 1, and the sound box 2 is described by using an example in which a UWB module is configured for the television 1, the sound box 1, and the sound box 2 (that is, the three first electronic devices 100). As shown in FIG. 4B(2), in response to the user choosing to turn on an identifier 411 of a device (for example, the sound box 2), the mobile phone enters a control interface of the sound box 2 shown in FIG. 4C(1). The control interface includes a setting control for each function of the sound box 2, for example, a control 412 "Establish the UWB system". In response to the user operating the control 412, the mobile phone displays a setting interface shown in FIG. 4C(2). The setting interface may set a communication address of the sound box 2. Certainly, because the sound box 2 is the $1^{st}$ device (which may be used as a primary device) set in the UWB system, the communication address may alternatively be a default address.

It should be noted that a plurality of base stations in the UWB system may use a time division multiple access (time division multiple access, TDMA) or a code division multiple access (code division multiple access, CDMA) communication technology to receive a UWB signal sent by another device, or send a UWB signal to another device. Therefore, communication addresses for devices added to the UWB system need to be set separately.

Figure 4E:
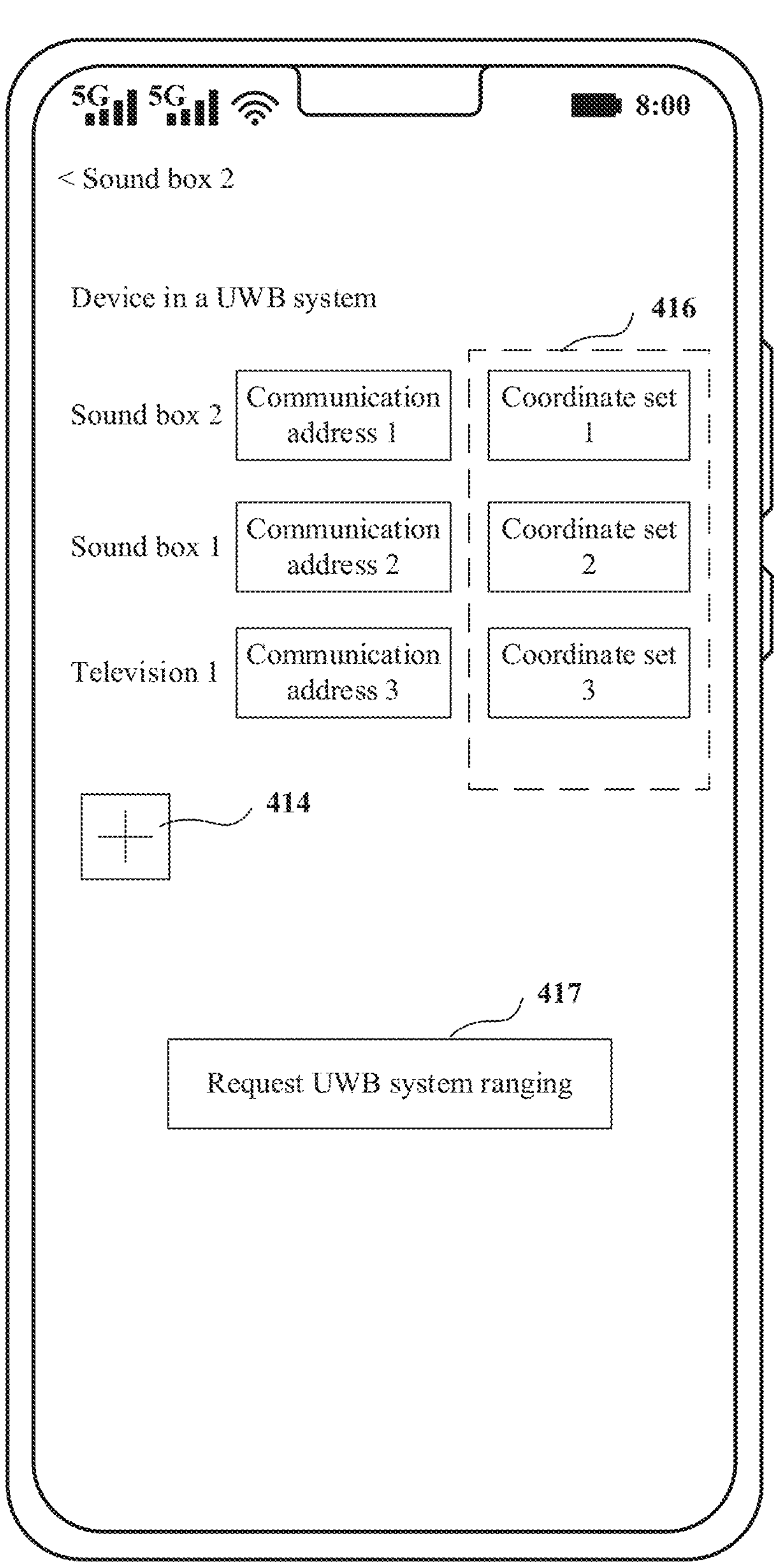
FIG. 4E is a schematic diagram of some other interfaces of a third electronic device according to an embodiment of this application.

After the communication address of the sound box 2 is set, the mobile phone displays an interface shown in FIG. 4D(1). The interface shows that the sound box 2 is added to be a base station in a newly established UWB system. Further, the user may add another base station in the UWB system by using an add control 414 in the interface. For example, in response to the user operating the add control 414, the mobile phone may display another device that has a UWB module and that has been registered in the home application and has been configured with a network. The user can select one or more devices to add to the UWB system and set a communication address for each added device. Certainly, the mobile phone may alternatively set a default communication address for each device based on a sequence in which each device is added. This is not limited in this embodiment of this application. As the interface shown in FIG. 4D(2), the sound box 2, the sound box 1, and the television 1 are added as UWB base stations in the UWB system. The UWB system can then be initialized. In response to the user operating a UWB system initialization control 415, the mobile phone (including the UWB module) may send UWB signals to the three base stations, requesting measurement of distances of the mobile phone relative to the three base stations. In addition, navigation coordinates of the UWB system are established by using a location of one of the base stations as an origin, and coordinates of other base stations under the navigation coordinates of the UWB system are obtained through calculation based on the distances of the mobile phone relative to the three base stations. After the initialization of the UWB system is completed, the mobile phone may display an interface as shown in FIG. 4E. The interface may display coordinates 416 of each base station under the navigation coordinates of the UWB system. Then, the user may trigger the first electronic device 100 to measure a location of the third electronic device 300 in the navigation coordinate system by operating a control 417 "Request UWB system ranging".

In this way, the positioning system formed by the first electronic device 100 may implement positioning of devices in the area 1.

S402: The third electronic device 300 sets a communication address of a second electronic device 200 located in an area 2.

For example, when a device in the area 2 needs to be positioned, one or more second electronic devices 200 may be disposed in the area 2, and the one or more second electronic devices 200 are initialized. In an example, if the second electronic device is a single-antenna architecture, at least three second electronic devices 200 need to be disposed in the area 2. In the following, an example in which three second electronic devices 200 are disposed in the area 2 is used for description.

In this application, a unified navigation coordinate system needs to be established in the area 1 and the area 2. Therefore, the second electronic device 200 located in the area 2 and the first electronic device 100 in the area 1 belong to a same positioning system. In this case, in the positioning system, the first electronic device 100 and the second electronic device 200 may use a time division multiple access (time division multiple access, TDMA) or a code division multiple access (code division multiple access, CDMA) communication technology to receive a UWB signal sent by the third electronic device 300. Therefore, different communication timeslots or pseudo random binary sequences are uniformly allocated to the first electronic device 100 and the second electronic device 200. In this case, each second electronic device 200 in the area 2 receives, in a respective allocated communication timeslot, a UWB signal sent to the second electronic device 200, or parses and sends, by using a respective pseudo random binary sequence, a UWB signal sent to the second electronic device 200.

In a specific implementation, the second electronic device 200 in the area 2 may be set still by using a control device (for example, a third electronic device 300) on which a home application is installed. Still, for example, the control device is a mobile phone. First, the user performs registration and network configuration on the second electronic device 200 in the area 2 by using a home application. As shown in FIG. 4F(1), devices newly added to a primary bedroom (that is, the area 2) are displayed on a home screen of the home application: a sound box 3, a television 2, and a sound box 4 (that is, the second electronic device 200). Optionally, the home application may alternatively mark a primary device of the UWB system, for example, mark the primary device sound box 2 of the UWB system established in step S400, for example, a primary device marked as a UWB system 1. A marking manner is not limited in this application. Then, in response to the user operating an identifier 418 of the sound box 2, the mobile phone enters a control interface of the sound box 2 shown in FIG. 4F(2). The user may add the devices in the primary bedroom as base stations in the UWB system 1 by using an add control 419. In an adding process, a communication address is set for each newly added device. For a specific adding process, refer to the method for adding a base station in step S400. As a control interface shown in FIG. 4G(1), the sound box 3, the sound box 4, and the television 2 are added as the base stations in the UWB system 1. It may be noted that, at this time, coordinates of the newly added devices in the UWB system 1 are unknown. The control interface displays a control 420 "Newly added base station initialization". In response to the user operating the control 420, the mobile phone triggers initialization of the newly added base stations (the sound box 3, the sound box 4, and the television 2). In an example, the mobile phone may display an interface shown in FIG. 4G(2), to prompt the user to return to the area 1 (that is, the living room) and start initializing a newly added base station.

S403: At a moment 1, the third electronic device 300 is located in the area 1, requests each first electronic device 100 to perform ranging, and obtains an initial position of the third electronic device 300, which is denoted as p0. In addition, the third electronic device 300 starts IMU measurement to measure motion data of the third electronic device 300.

Figure 5A:
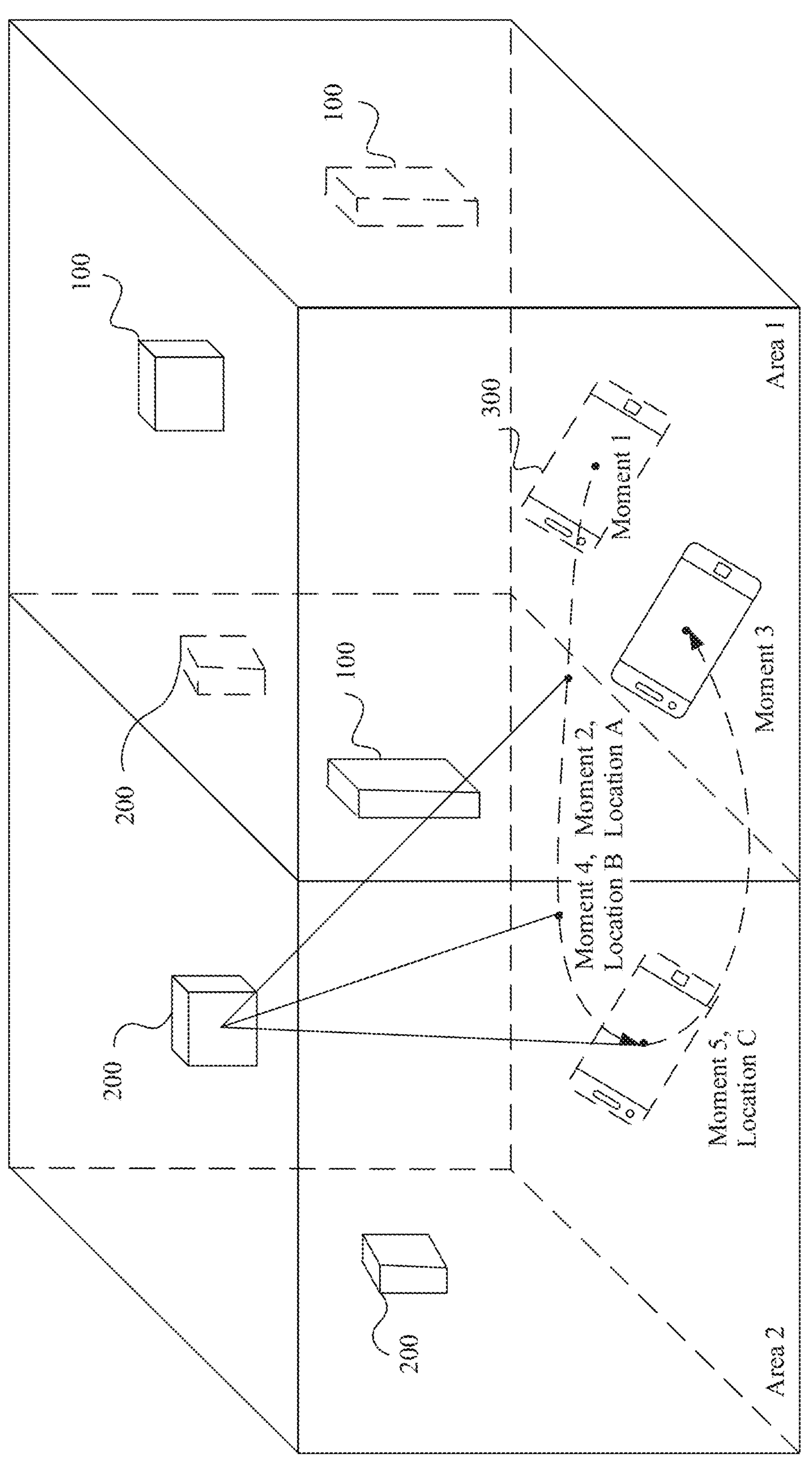
FIG. 5A is a schematic diagram of moving tracks of a third electronic device in different areas according to an embodiment of this application.

Refer to FIG. 5A. FIG. 5A shows a moving track of the third electronic device 300, that is, locations of the third electronic device 300 at different moments are marked.

As shown in FIG. 5A, at the moment 1, the third electronic device 300 is located in the area 1. In this case, the third electronic device 300 may request ranging from each first electronic device 100 in the area 1. In this case, the first electronic device 100 may receive, in a communication timeslot of the first electronic device 100, a ranging request sent by the third electronic device 300, or the first electronic device 100 may parse, by using a pseudo random binary sequence of the first electronic device 100, a ranging request sent by the third electronic device 300. For example, a distance between the first electronic device 100 and the third electronic device 300 may be measured by using a bidirectional ranging method. In some examples, the third electronic device 300 may obtain, through calculation based on a measured distance between each first electronic device 100 and the third electronic device 300 and prestored coordinates of each first electronic device 100, coordinates of the third electronic device 300 in the navigation coordinate system at this time, that is, the initial position.

In addition, beginning from the initial position, the third electronic device 300 starts an IMU module 370, to measure the motion data of the third electronic device 300, and to calculate the moving track of the third electronic device 300. In some examples, the third electronic device 300 may prompt the user to perform a preset operation. The preset operation may enable the third electronic device 300 to be in a preset attitude and start the IMU measurement. The preset attitude may be, for example, the user operating the third electronic device 300, so that a specific direction of a coordinate axis (for example, a Y axis of a b system) of the third electronic device 300 is aligned with the first electronic device 100. In this case, an attitude of the third electronic device 300 is an initial attitude. The initial attitude may be represented by an attitude angle (for example, a pitch angle, an azimuth angle, and a roll angle), and the attitude angle may be obtained through calculation based on attitude data (angular velocity of three axes of a carrier coordinate system) measured by the IMU module of the third electronic device 300. A process in which the user performs the preset operation is also referred to as a process of calibrating the initial attitude of the third electronic device 300.

Optionally, the third electronic device 300 may prompt the user to move the third electronic device 300 from the initial position, move from the area 1 to the area 2, and finally return to the area 2. A prompt manner and a prompt occasion of the third electronic device 300 are not limited in this application.

In a specific implementation, a control device (for example, the third electronic device 300) on which the home application is installed may still be used to prompt the user to perform a corresponding operation, to cooperate with the user to complete initialization of the second electronic device 200. Still, for example, the control device is a mobile phone. As shown in FIG. 4G(2), the mobile phone displays prompt information, to prompt the user to carry the mobile phone back to the living room. When the user carries the mobile phone back to the living room, and taps a control 421 "Already returned to the living room". In response to the user tapping the control 421, the mobile phone may display a prompt interface shown in FIG. 4H(1), and prompt the user to point the top of the mobile phone to the sound box 2. This is at the moment 1, and the mobile phone is in the initial position. The mobile phone measures the initial position p0 of the mobile phone in the UWB system for the first electronic device 100. In addition, the mobile phone starts the IMU measurement at the same time, to measure motion data of the mobile phone.

S404: At a moment 2, the third electronic device 300 enters the area 2, and obtains distances between the third electronic device 300 and each second electronic device 200 at at least three locations. Alternatively, attitude data of the third electronic device 300 when the third electronic device 300 points to each second electronic device 200 at at least two locations is obtained.

In a technical solution, after the third electronic device 300 enters the area 2, each second electronic device 200 is requested to perform ranging at at least three locations, to obtain distances between each second electronic device 200 and the third electronic device 300 in the area 2.

In an example of the technical solution, the third electronic device 300 (that is, the mobile phone) may display a prompt interface shown in FIG. 4H(2), to prompt the user to enter the area 2 (that is, the primary bedroom) holding the third electronic device 300. After entering the area 2, the user operates the third electronic device 300 (for example, operating a control 422 "Already entered the primary bedroom"). The third electronic device 300 requests each second electronic device 200 in the area 2 to measure the distance from the third electronic device 300 in response to the operation of the user. Time at which the third electronic device 300 receives the operation of the third electronic device 300 by the user is the moment 2. In another example, the third electronic device 300 may display a prompt interface shown in FIG. 4H(3), to prompt the user to enter the area 2 within a preset time period (for example, 1 minute or 5 minutes) after the moment 1. In this case, the third electronic device 300 may start to request ranging from the second electronic device 20 after the preset time period and after the moment 1. In still another example, the third electronic device 300 may start to request the second electronic device 200 to perform ranging at a time interval after the moment 1. The third electronic device 300 may receive no UWB signal sent by the second electronic device, or a received UWB signal sent by the second electronic device is weak. In this case, the third electronic device 300 does not calculate the distances between the third electronic device 300 and each second electronic device 200. After the third electronic device 300 enters the area 2, the third electronic device 300 may receive a UWB signal sent by the second electronic device, or a received UWB signal sent by the second electronic device is strong, and the third electronic device 300 starts to calculate the distances between the third electronic device 300 and each second electronic device 200. In still another example, the third electronic device 300 may alternatively start to request ranging from the second electronic device 200 after determining, based on the motion data obtained through the IMU measurement, that the third electronic device 300 roughly enters the area 2. In other words, an occasion at which the third electronic device 30) starts to request ranging from the second electronic device 200 is not limited in this application.

Then, in some embodiments, it is needed to obtain through measurement that when the third electronic device 300 is located in at least three locations in the area 2 (the three locations cannot be located in the same line as the second electronic device 200), the distances from each second electronic device 200. For example, as shown in FIG. 5A, at least the distances between the third electronic device 300 and each second electronic device 200 is measured when the third electronic device 300 is located at a location A (corresponding to the moment 2), a location B (corresponding to a moment 4), and a location C (corresponding to a moment 5). FIG. 5A shows only distances between one second electronic device and a third electronic device when the second electronic device is at three locations. During specific implementation, the third electronic device 300 (that is, the mobile phone) may automatically select three locations, and request ranging from the second electronic device 200. Alternatively, the third electronic device 300 may select, according to an operation of the user, three locations specified by the user to request ranging from the second electronic device 200. For example, after the user operates the control "Already entered the primary bedroom" shown in FIG. 4H(2), or after the preset time period (for example, 1 minute) after the third electronic device 300 displays the interface shown in FIG. 4H (3), an interface shown in FIG. 4I(1) is displayed, and is used to prompt the user to select at least three locations in the area 2, and request the second electronic device 200 to perform ranging. When receiving that the user taps a ranging control 423, the third electronic device 300 sends a ranging request to the second electronic device 200 once, where the ranging request is used to measure a distance between the third electronic device and a corresponding second electronic device 200 at the location.

In another technical solution, after the third electronic device 300 enters the area 2, at at least two locations (for example, the location C and the location B), attitude information of the third electronic device when the third electronic device 30) points to each second electronic device is recorded. The attitude information may be represented by an attitude angle (like a pitch angle, an azimuth angle, and a roll angle), and may be obtained through calculation by using angular velocity output by the IMU module of the third electronic device 300. For a specific calculation method, refer to the following description.

That the third electronic device 300 points to a second electronic device 200 means that a specific coordinate axis in a carrier coordinate system of the third electronic device 300 is aligned with the second electronic device 200. For example, the third electronic device 300 is a mobile phone. Based on habits of using mobile phones of most users, an orientation (or a direction of the mobile phone) may be defined as a direction parallel to a long side of the mobile phone and pointing along the bottom of the mobile phone to the top. Therefore, the orientation of the mobile phone may be referred to as a top orientation of the mobile phone. Generally, the top of the mobile phone is a body part on which hardware such as a front-facing camera, an infrared transmitter, an earpiece, a light sensor, or a distance sensor is installed. The bottom of the mobile phone is a body part with a microphone and a speaker.

When the third electronic device 300 enters the area 2, for related interfaces displayed by the third electronic device 300, refer to FIG. 4H(2) and FIG. 4H(3). Then, the third electronic device 300 may display an interface shown in FIG. 4I(3), to prompt the user to successively point to each second electronic device 200 at the at least two locations. When the user taps an OK control 425, the third electronic device calculates attitude information pointing to the corresponding second electronic device 200 at the location.

It should be noted that, in this step, the third electronic device 300 continuously performs IMU measurement to measure the motion data of the third electronic device 300.

S405: At a moment 3, the third electronic device 300 returns to the area 1, requests each first electronic device 100 to perform ranging, and obtains an end point position of the third electronic device 300, where the end point location is denoted as p1.

In some examples, the third electronic device 300 may close the IMU measurement at the end point position. For example, when obtaining the end point position, the third electronic device 300 closes the IMU measurement. Alternatively, the third electronic device 300 closes the IMU measurement, and prompts the user to keep a preset time period (for example, 30 seconds) at the current location. Within the preset time period, the third electronic device 300 sends a ranging request to each first electronic device 100, and obtains an end point position.

For example, after step S404 is performed, the third electronic device 30) may display an interface shown in FIG. 4I(2), to prompt the user to return to the living room. When the user returns to the living room, the user may operate the control 424 "Already returned to the living room". When the third electronic device 300 receives the user operation on the control 424, that is, at the moment 3, the third electronic device requests each first electronic device 100 to perform ranging.

S406: The third electronic device 300 estimates the moving track of the third electronic device 300 based on the initial position and the motion data that is of the third electronic device 300 and that is obtained through the IMU measurement.

Herein, that the third electronic device 3M) is a mobile phone is used as an example. The carrier coordinate system (that is, the b system) of the third electronic device, a navigation coordinate system(that is, an n system) of the third electronic device, and the navigation coordinate system (that is, a U system) established by the first electronic device 100 are first described.

Figure 6:
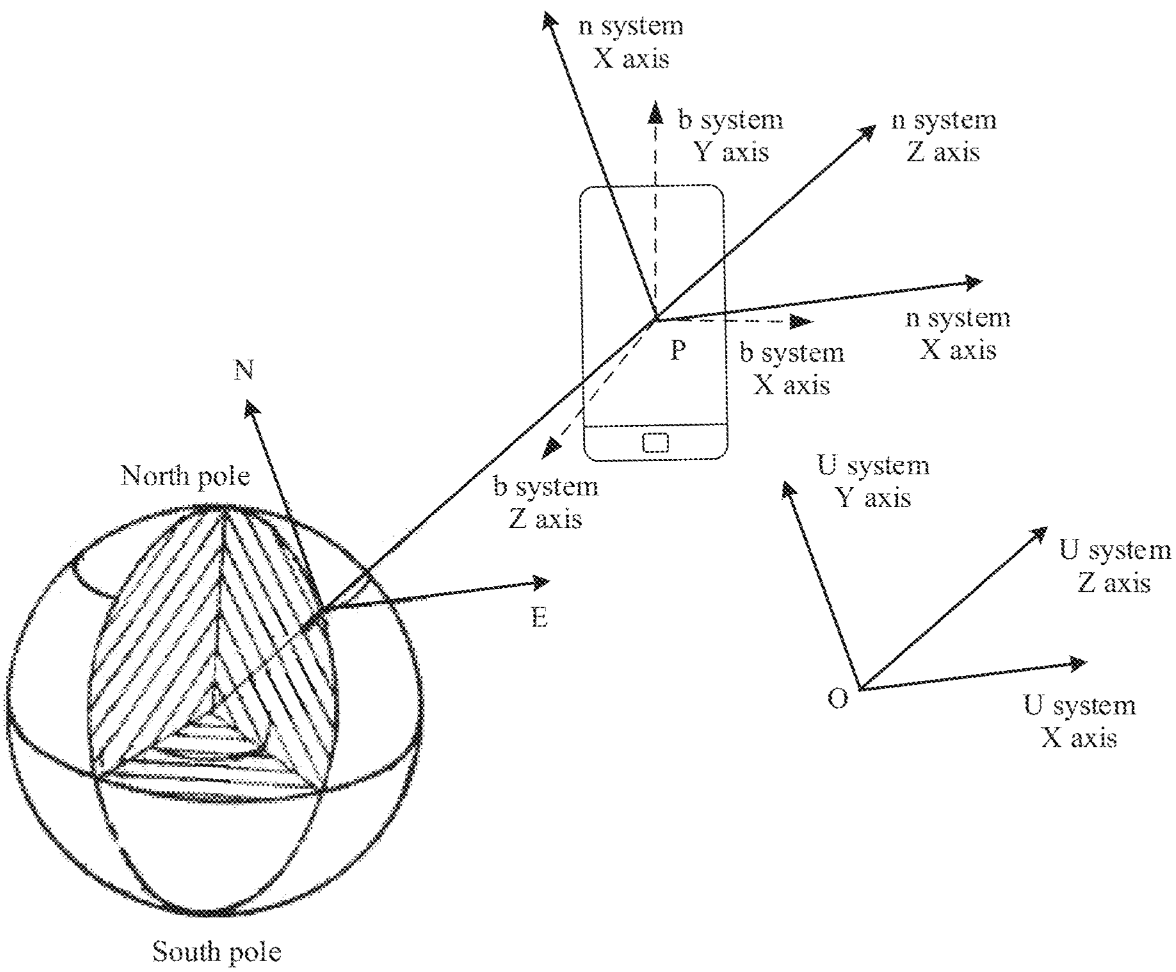
FIG. 6 is a schematic diagram of three coordinate systems according to an embodiment of this application.

Refer to FIG. 6. In a b system, a point P in a firmware center of the mobile phone is used as an origin. A Y axis and an X axis of the b system are directions parallel to a screen plane of the mobile phone, the Y axis is a direction along a length of the mobile phone, and the X axis is a direction along a width of the mobile phone. AZ axis of the b system is a direction perpendicular to a screen of the mobile phone, and a direction from the back of the screen of the mobile phone to the front of the screen of the mobile phone is a positive direction of the Z axis.

In an n system, the point P in the firmware center of the mobile phone is also used as an origin. An X axis of the n system points to the east (E) along a local latitude line, a Y axis of the n system points to the north (N) along a local meridian line, and a Z axis of the n system points up along a local geographical vertical line, and the X, Y and Z axes form a right-handed rectangular coordinate system. A plane formed by the X axis and the Y axis is a local horizontal plane, and a plane formed by the Y axis and the Z axis is a local plumb line.

The U system is a rectangular coordinate system established by the first electronic device 100. In some examples, when there is one first electronic device 100 (the first electronic device 100 is a multi-antenna architecture), a location point O of a UWB antenna in the first electronic device 100 is used as an origin. In some other examples, when there are three or more first electronic devices 100 (the first electronic device 100 is a single-antenna architecture), a location point O of a UWB antenna in one of the first electronic devices 100 is used as an origin. For ease of subsequent calculation, directions of three axes of the U system are the same as those of the n system That is, an X axis of the U system points to the east (E) along a local latitude line, a Y axis of the U system points to the north (N) along a local meridian line, and a Z axis of the U system points up along a local geographical vertical line, and the X, Y and Z axes form a right-handed rectangular coordinate system. That is, a difference between the U system and the n system is that the origins are different, and the directions of the three axes are the same.

(1) Solve the Attitude of the Third Electronic Device 300

After the third electronic device 300 starts an IMU module 370, the IMU module 370 collects motion data of the third electronic device 300 according to a specific frequency, including acceleration (respectively denoted as $$a_x^b,\ a_y^b,\ \text{and}\ a_z^b$$

of the third electronic device 300 on three axes in a carrier coordinate system (the b system for short). Angular velocities (denoted as $$\varpi_x^b,\ \varpi_y^b,\ \text{and}\ \varpi_z^b,$$

respectively) of the b system around three axes in a geographical coordinate system (the n system for short).

In some examples, an integral operation is performed on the angular velocities $$\left(\varpi_x^b,\ \varpi_y^b,\ \text{and}\ \varpi_z^b\right)$$

collected by the IMU module 370, to obtain an angle change of the third electronic device 300 on the three axes, that is, an attitude change of the third electronic device 300 is obtained. Based on the angle change of the third electronic device 300 and the initial attitude (obtained through calculation in step S403) of the third electronic device 300, attitudes of the third electronic device 300 at various moments may be obtained. In some other examples, when the attitude of the third electronic device 300 is solved, fusion calculation may alternatively be performed with reference to the acceleration collected by the IMU module 370 or data of another sensor, to obtain a more accurate attitude. This is not limited in this embodiment of this application.

(2) Solve Speed of the Third Electronic Device 300 on the U System.

An integral operation is performed on the accelerations $$\left(a_x^b,\ a_y^b,\ \text{and}\ a_z^b\right)$$

collected by the IMU module 370, to obtain speeds $$\left(\text{denoted as}\ v_x^b,\ v_y^b,\ \text{and}\ v_z^b\right)$$

of the third electronic device 300 on the three axes of the b system. The speeds of the third electronic device 300 on the three axes of the b system may be converted by using the attitudes of the third electronic device 300 at each moment calculated in (1) to obtain speeds (denoted as $$\left(\text{denoted as}\ v_x^U,\ v_y^U,\ \text{and}\ v_z^U\right)$$

of the third electronic device 300 on the U system.

(3) Solve the Location of the Third Electronic Device 300

An integral operation is performed on the speeds (denoted as $$\left(\text{denoted as}\ v_x^U,\ v_y^U,\ \text{and}\ v_z^U\right)$$

of the third electronic device 300 in the U system, to obtain a location change of the third electronic device 300. With reference to the initial position of the third electronic device 300, locations of the third electronic device in an entire moving process from the moment 1 to the moment 3, that is, a moving track, may be estimated, including estimating an end point position of the third electronic device 300, which is denoted as p1'.

S407: Obtain a corrected moving track of the third electronic device 300 based on the end point position p1 measured by the first electronic device 100 and the estimated moving track of the third electronic device 300.

Because p1' obtained by the third electronic device 300 through calculation by using the motion data collected by the IMU module 370 has a time accumulation error, and it is considered that p1 obtained by measurement by a UWB system (the first electronic device 100) with high positioning accuracy is accurate location information, a difference between p1' and p1 may be used to correct the moving track that is of the third electronic device 300 and that is estimated in step S406.

In a specific embodiment, a Kalman filter (Kalman filter) may be used for correction.

Figure 7:
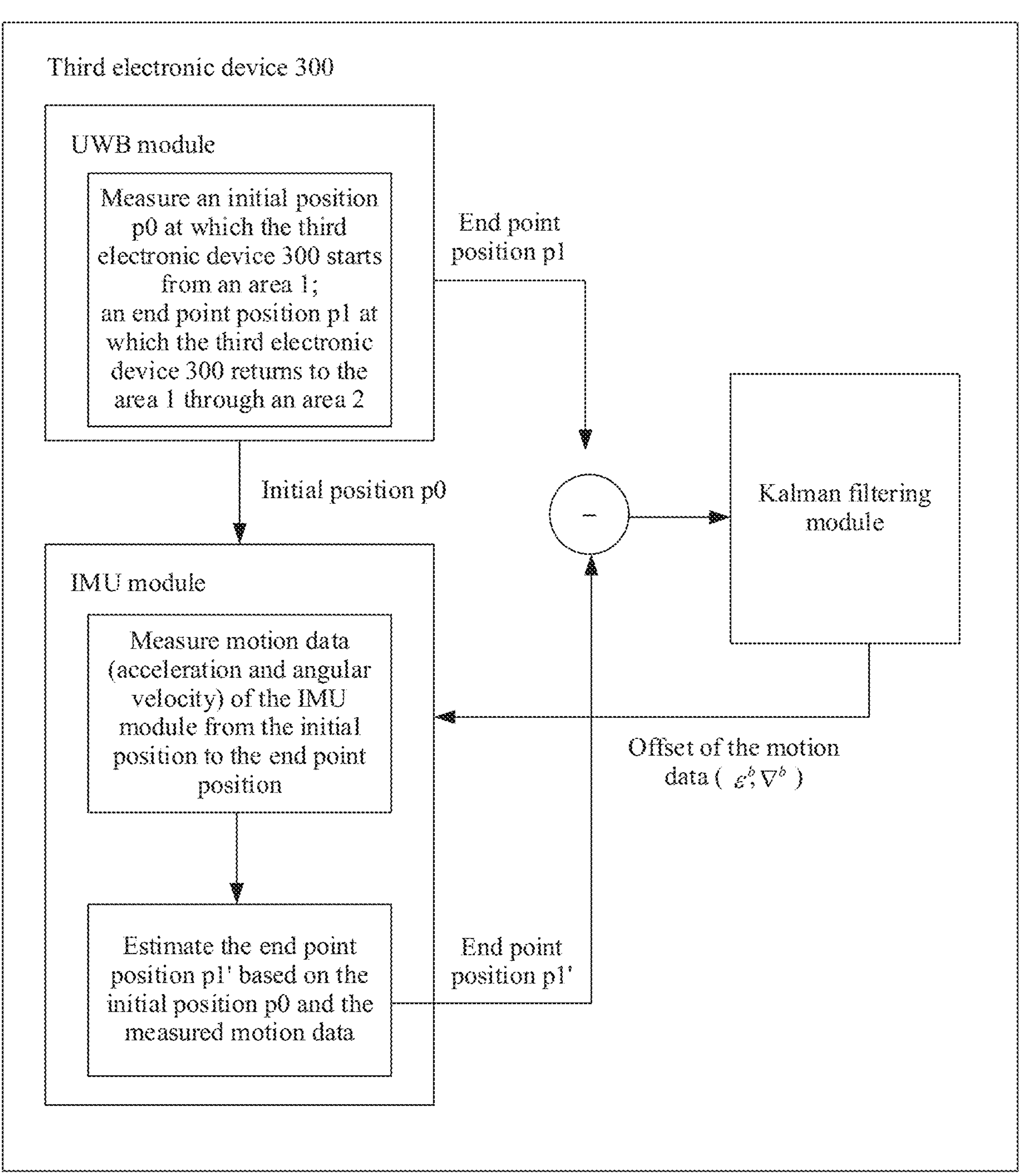
FIG. 7 is a schematic diagram of a Kalman filtering process according to an embodiment of this application.

As shown in FIG. 7, FIG. 7 is a schematic diagram of data processing of modules in the third electronic device 300. A UWB module 350 is configured to obtain an initial position p0 at which the third electronic device 300 starts from the area 1, and an end point position p1 at which the third electronic device 300 returns to the area 1 through the area 2. The UWB module 350 sends the initial position p0 to the IMU module 370, and the IMU module 370 measures motion data (acceleration and angular velocity) of the IMU module 370 from the initial position to the end point position. An end point position p1' is estimated with reference to the initial position p0 sent by the UWB module 350. The IMU module 370 inputs the end point position p1' and the UWB module 350 inputs the end point position p1 to a Kalman filtering module (for example, the Kalman filter module may be located in a processor 310 in the third electronic device 300), and outputs and obtains an offset of estimated optimal motion data. Then, the IMU module 370 may correct, based on the offset of the motion data (for example, a bias error $\varepsilon^b$ of a gyroscope, a bias error $\nabla^b$ of an accelerometer), the motion data measured by the IMU module 370, and obtain the corrected moving track based on the corrected motion data.

The following describes a filtering process of the Kalman filtering module in detail.

The Kalman filtering is an algorithm that performs an optimal evaluation on a system status by using a linear system status model and by inputting or outputting observation data through a system. Because the observation data includes effects of noise and interference in the system, an optimal estimation process may also be considered as a filtering process. Data filtering is a data processing technology to remove noise and restore real data.

The linear system status model describes a status of a system that changes with time, and is expressed by using Formula (1):

$$x_m = \Phi_{m|m-1} x_{m-1} + w_{m-1} \qquad \text{Formula (1)}$$

$x_m$ represents a state quantity in an $m^{th}$ epoch, $\Phi_{(m|m-1)}$ represents a state transition matrix, and $w_{(m-1)}$ represents a process noise vector. In order to correct an estimated value of the state quantity, the state quantity or another variable associated with the state quantity needs to be observed. If observations are not the state quantity, observations of the variable need to be converted into observations of the state quantity through calculation. In order to achieve the above objective, a measurement equation needs to be established. The measurement equation of the system represents a relationship between a state quantity and observations of the system, as shown in Formula (2):

$$y_m = H_m x_m + v_m \qquad \text{Formula (2)}$$

$y_m$ represents the observations of the system, $H_m$ represents an observation matrix, and $v_m$ represents a measurement noise vector.

In this embodiment of this application, as shown in Formula (3), a state quantity of the Kalman filter may be set:

$$x = \left[(\varphi^U)^T\ (\delta v^U)^T\ \ (\delta p^v)^T\ \ \varepsilon^b\ \ \nabla^b\right]^T \qquad \text{Formula (3)}$$

$\varphi^U$, $\delta v^U$ and $\delta p^U$ are respectively an attitude error, a speed error, and a location error that are in the U system of the third electronic device 300, $\varepsilon^b$ is an angular velocity bias error output by the gyroscope in the third electronic device 300, and $\nabla^b$ is an acceleration bias error output by the accelerometer in the third electronic device 300.

In addition, a differential relationship between each state quantity in Formula (3) may be represented by using Formula (4);

$$\begin{cases} \dot{\varphi}^U = -C_b^U \cdot \varepsilon^b \\ \delta\dot{v} = f_{sf}^U \times \varphi^U + C_b^U \cdot \nabla^b \\ \delta\dot{p}^U = \delta v^U \\ \varepsilon^b = \begin{bmatrix} \varepsilon_x^b & \varepsilon_y^b & \varepsilon_z^b \end{bmatrix} \\ \nabla^b = \begin{bmatrix} \nabla_x^b & \nabla_y^b & \nabla_z^b \end{bmatrix} \end{cases} \quad \text{Formula (4)}$$

$$C_b^U$$

is a conversion matrix of the b system and the U system, and $$f_{sf}^U$$

is an acceleration after the acceleration $$a_x^b, a_y^b, \text{ and } a_z^b$$

output by the accelerometer in the IMU module is converted to the U system.

Rewrite a differential equation of the Formula (4) into a matrix form to obtain Formula (5):

$$F_{15\times15} = \begin{bmatrix} 0_{3\times3} & 0_{3\times3} & 0_{3\times3} & -C_b^U & 0_{3\times3} \\ f_{sf}^U \times & 0_{3\times3} & 0_{3\times3} & 0_{3\times3} & C_b^U \\ 0_{3\times3} & f_{3\times3} & 0_{3\times3} & 0_{3\times3} & 0_{3\times3} \\ 0_{3\times3} & 0_{3\times3} & 0_{3\times3} & 0_{3\times3} & 0_{3\times3} \\ 0_{3\times3} & 0_{3\times3} & 0_{3\times3} & 0_{3\times3} & 0_{3\times3} \end{bmatrix} \quad \text{Formula (5)}$$

Then the differential equation is obtained, as shown in Formula (6):

$$\dot{x} = F_{15\times15}x \quad \text{Formula (6)}$$

Further, a linear system status model equation is obtained, as shown in Formula (7);

$$x_m = [F_{15\times15} \cdot \Delta t + I] \cdot x_{m-1} + w_{m-1} \quad \text{Formula (7)}$$

$\Delta t$ is a time interval from a moment m−1 to a moment m, and $w_{m-1}$ is a noise vector that calculates the moving track based on output data of the IMU module 370.

In this embodiment of this application, the measurement equation is Formula (8), and is as follows:

$$y_m = p1' - p1 \quad \text{Formula (8)}$$

According to Formula (8), the bias error $\varepsilon^b$ of the gyroscope and the bias error $\nabla^b$ of the accelerometer can be transferred and calculated in combination with the Kalman filtering algorithm.

Then, the angular velocity and the acceleration that are output by the gyroscope and the accelerometer are corrected based on the bias error $\varepsilon^b$ of the gyroscope and the bias error $\nabla^b$ of the accelerometer respectively, and the moving track of the third electronic device 300 from the moment 1 to the moment 3 is calculated again by using the corrected angular velocity and the corrected acceleration.

For example, as shown in FIG. 5A, coordinates of the third electronic device 300 at the location A, location B, and location C are obtained through recalculating based on the corrected angular velocity and the acceleration, and are respectively denoted as point A($x_A$, $y_A$, $z_A$), point B($x_m$, $y_B$, $z_B$) and point C ($x_C$, $y_C$, $z_C$).

S408: The third electronic device 300 calculates coordinates of each second electronic device 200 in the navigation coordinate system based on the corrected moving track of the third electronic device 300 and the measured distances between the third electronic device 300 and each second electronic device 200. Alternatively, the third electronic device 300 calculates coordinates of each second electronic device 200 in the navigation coordinate system based on the corrected moving track of the third electronic device 300 and the measured attitude information of the third electronic device 300 when the third electronic device 300 points to each second electronic device 200.

In a technical solution, in step S404, distances between the third electronic device 300 and the second electronic device 200 at the point A, point B. and point C are obtained through measurement. In this case, location information of each second electronic device 200 may be obtained through calculation with reference to the location information of the point A, point B, and point C that are obtained in step S407.

One of the second electronic devices 200 is used as an example for description herein. A distance measured by a second electronic device 200 between the second electronic device and the third electronic device 300 is $r_A$, $r_B$, and $r_C$ respectively. A location of the second electronic device 200 is unknown, denoted as (x, y, z), and Formula (9) may be obtained as follows:

$$\begin{cases} \sqrt{(x-x_A)^2 + (y-y_A)^2 + (z-z_A)^2} = r_A \\ \sqrt{(x-x_B)^2 + (y-y_B)^2 + (z-z_B)^2} = r_B \\ \sqrt{(x-x_C)^2 + (y-y_C)^2 + (z-z_C)^2} = r_C \end{cases} \quad \text{Formula (9)}$$

The location (x, y, z) of the second electronic device 200 may be obtained by solving the Formula (9). In some other embodiments, coordinates of more locations other than the point A, the point B, and the point C, and a distance corresponding to each location may be obtained, more equation sets may be established, and a more accurate location of the second electronic device 200 is obtained by using Newton iteration and a least square method.

Figure 4J:
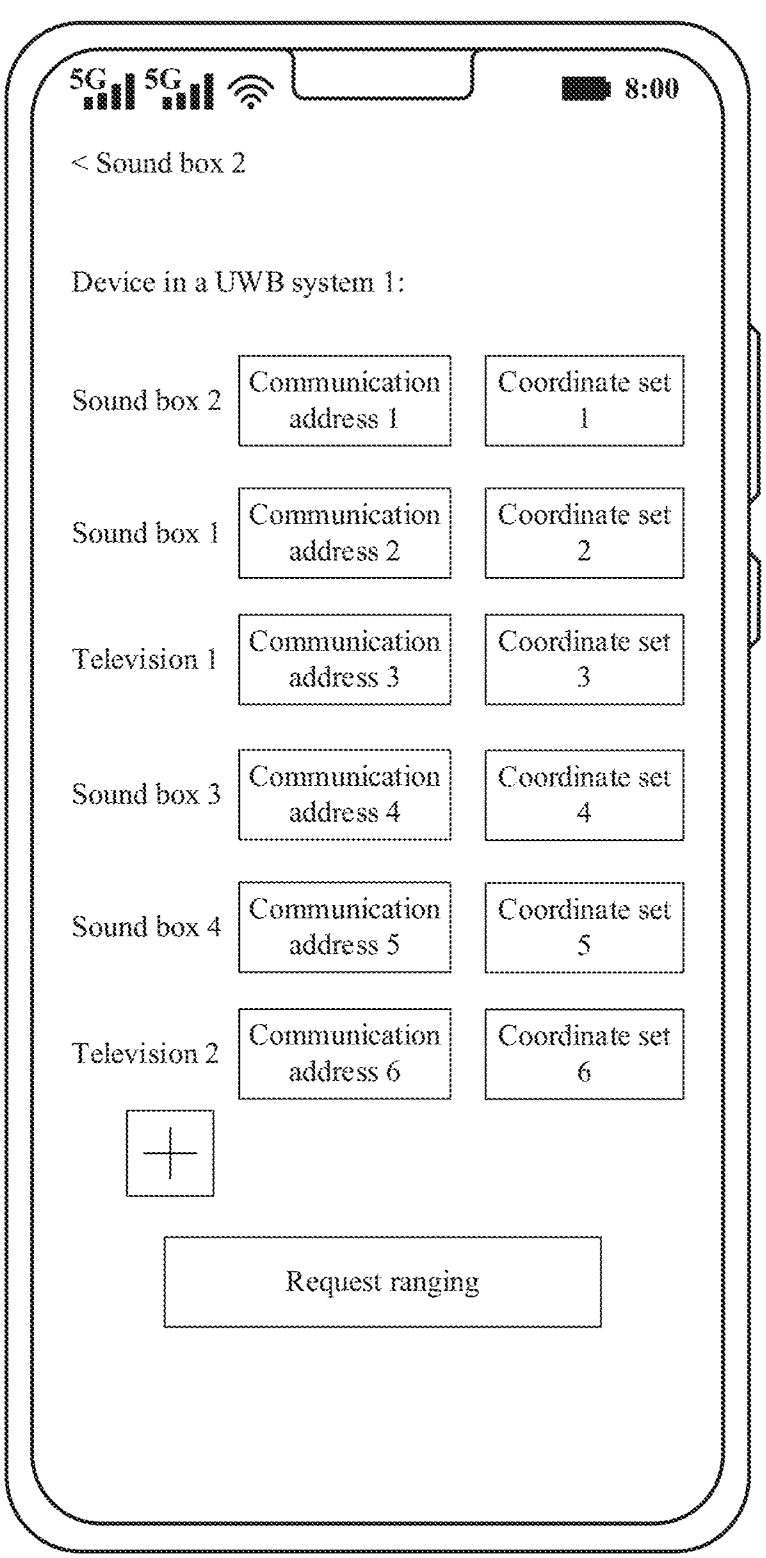
FIG. 4J is a schematic diagram of some other interfaces of a third electronic device according to an embodiment of this application.

A method for solving a location of another second electronic device 200 is the same as that described herein. Details are not described again. As shown in FIG. 4J, after obtaining the coordinates of each second electronic device 200 in the navigation coordinate system of the UWB system through calculation, the third electronic device 300 may display an interface shown in FIG. 4J. At this time, initialization of a newly added base station is complete.

Then, when the third electronic device 300 is located in the area 2, the third electronic device 300 may request the second electronic device 200 to measure the distance, and then obtain a current location of the third electronic device 300 through calculation based on the distance obtained through measurement and the locations of each second electronic device 200. That is, positioning, navigation, and the like of the third electronic device 300 located in the area 2 are implemented by using the second electronic device 200.

In another technical solution, in step S404, attitude information of the third electronic device 300 pointing to the second electronic device 200 is obtained through measurement when the third electronic device 300 is separately at the point B and the point C. In this case, location information of each second electronic device 200 may be obtained through calculation with reference to the location information of the point B, and point C that are obtained in step S407.

One of the second electronic devices 200 is used as an example for description herein. For example, location information of the third electronic device 300 at a location i is ($x_i$, $y_i$, $z_i$). Attitude information of the third electronic device 300 pointing to the second electronic device at the location i includes a pitch angle s, an azimuth angle $\phi_i$, and a roll angle $\theta_i$ that are of the carrier coordinate system of the third electronic device 300 relative to the U system, where i successively has a value in {1, 2, . . . , n}, where n≥2, and n is an integer.

Figure 5B:
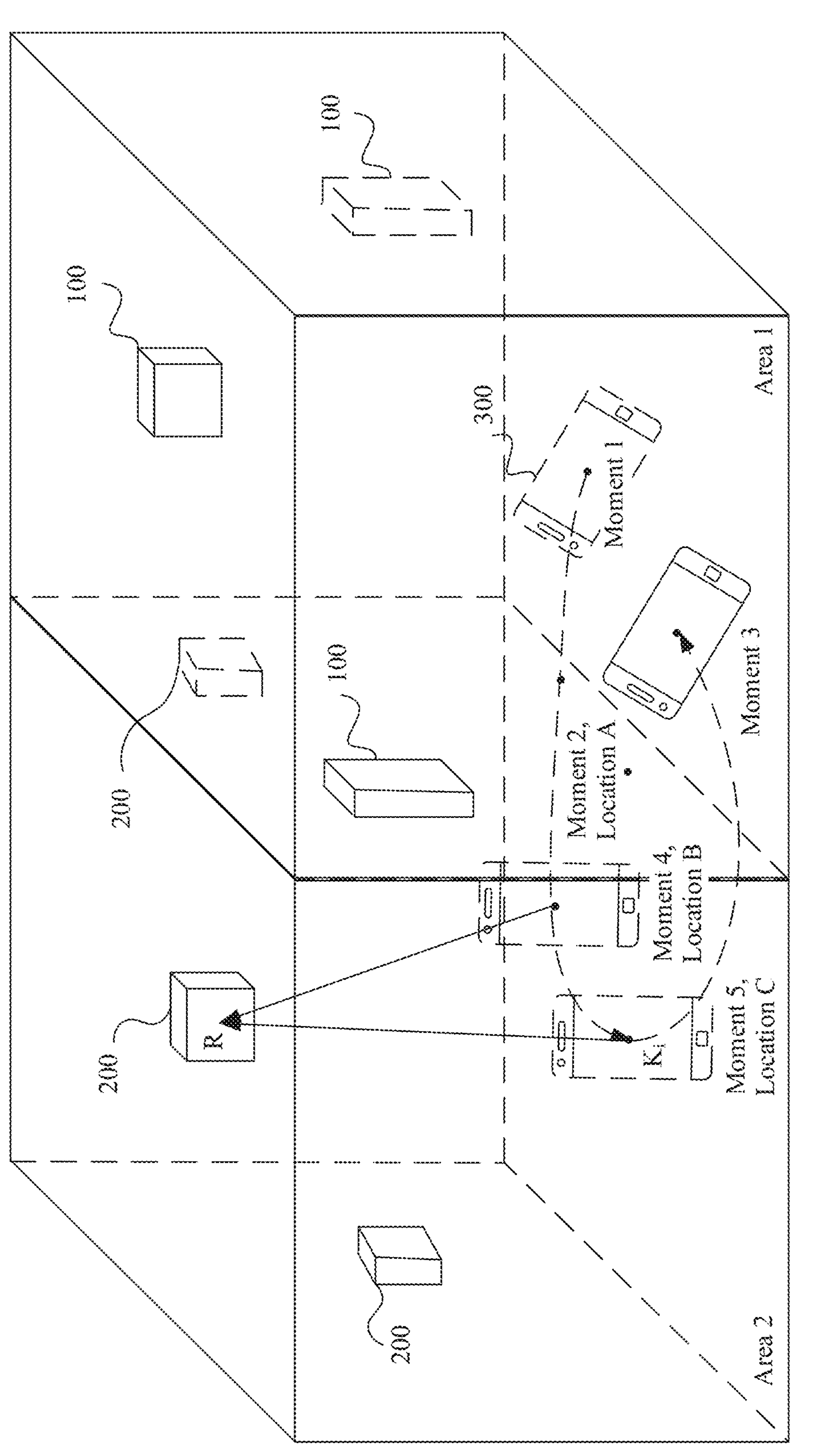
FIG. 5B is another schematic diagram of moving tracks of a third electronic device according to an embodiment of this application.

For example, when the third electronic device 300 is at a location B shown in FIG. 5B, a coordinate location of the third electronic device 300 in the U system is ($x_1$, $y_1$, $z_1$), and the attitude information of the third electronic device 300 includes a pitch angle $\varphi_1$, an azimuth angle $\phi_1$, and a roll angle $\theta_1$. When the third electronic device 300 is at a location C shown in FIG. 5B, a coordinate location of the third electronic device 300 in the U system is ($x_2$, $y_2$, $z_2$), and the attitude information of the third electronic device 300 includes a pitch angle $\varphi_2$, an azimuth angle $\phi_2$, and a roll angle $\theta_2$.

That is, when the third electronic device 300 is at the location i, a coordinate location of the third electronic device 300 in the U system is ($x_i$, $y_i$, $z_i$), and the attitude information is a pitch angle $\varphi_i$, an azimuth angle $\phi_i$, and a roll angle $\theta_i$, where i successively has a value in {1, 2, . . . , n}, where n≥2, and n is an integer. In the following embodiment, for example, when the third electronic device 300 is at the location i, the location information of the third electronic device 300 is ($x_i$, $y_i$, $z_i$), and the attitude information is the pitch angle $\varphi_i$, the azimuth angle $\phi_i$, and the roll angle $\theta_i$. A specific method performed by the third electronic device 300 to calculate location information (x, y, z) of the second electronic device is described.

The location information ($x_i$, $y_i$, $z_i$) and the attitude information (including the pitch angle $\varphi_i$, the azimuth angle $\phi_i$ and the roll angle $\theta_i$) of the third electronic device 300 are known. The location information (x, y, z) of the second electronic device is unknown, i successively has a value in {1, 2, . . . , n}, where n≥2, and n is an integer.

It should be understood that the location information (x, y, z) of the second electronic device is a coordinate location of the second electronic device in the U system, and (x, y, z) may be represented in matrix (1) with three rows and one column. The location information ($x_i$, $y_i$, $z_i$) of the third electronic device 300 is a coordinate location of the third electronic device 300 in the U system, and ($x_i$, $y_i$, $z_i$) may be represented in matrix (2) with three rows and one column.

$$\begin{bmatrix} x \\ y \\ z \end{bmatrix}_U \quad \text{Matrix (1)}$$

$$\begin{bmatrix} x_i \\ y_i \\ z_i \end{bmatrix}_U \quad \text{Matrix (1)}$$

Therefore, as shown in Formula (10), a vector $K_iR$ shown in FIG. 5B may be obtained through matrix (1)-matrix (2).

$$\text{Vector } K_iR = \begin{bmatrix} x \\ y \\ z \end{bmatrix}_U - \begin{bmatrix} x_i \\ y_i \\ z_i \end{bmatrix}_U \quad \text{Formula (10)}$$

Coordinates of the third electronic device 300 at the location i are Ki ($x_i$, $y_i$, $z_i$). Coordinates of the second electronic device are R (x, y, z). A subscript U in the foregoing matrix (1) and matrix (2) represents a U system constructed by the UWB base station. $K_i$ ($x_i$, $y_i$, $z_i$) and R (x, y, z) are coordinates in the U system, where ($x_i$, $y_i$, $z_i$) is known and (x, y, z) is unknown.

According to a coordinate system transfer principle, the following formula (II) may be obtained:

$$\text{Vector } K_iR = C_b^{U(i)} \cdot \begin{bmatrix} 0 \\ r_1 \\ 0 \end{bmatrix}_b = \begin{bmatrix} (-\cos\varphi_i \sin\phi_i) \times r_i \\ (-\cos\varphi_i \cos\phi_i) \times r_i \\ \sin\varphi_i \times r_i \end{bmatrix} \quad \text{Formula (11)}$$

$$C_b^{U(i)}$$

is a conversion matrix from the b system to the U system, may also be referred to as a rotation matrix from the b system to the U system, and may be obtained by using Formula (12), as follows:

$$C_b^{U(i)} = \begin{bmatrix} \cos\theta_i\cos\phi_i - \sin\varphi_i\sin\theta_i\sin\phi_i & -\cos\varphi_i\sin\phi_i & \sin\theta_i\cos\phi_i + \sin\varphi_i\cos\theta_i\sin\phi \\ \cos\theta_i\cos\phi_i + \sin\varphi_i\sin\theta_i\cos\phi_i & -\cos\varphi_i\sin\phi_i & \sin\theta_i\sin\phi_i + \sin\varphi_i\cos\theta_i\cos\phi_i \\ -\cos\varphi_i\sin\theta_i & \sin\varphi_i & \cos\varphi_i\cos\theta \end{bmatrix} \quad \text{Formula (12)}$$

$r_i$=$K_iR$, and $K_iR$ is a distance between the third electronic device 300 and the second electronic device when the third electronic device 300 is at the location i. When the third electronic device 300 points to the second electronic device at the location i, a Y axis of the b system of the third electronic device 300 passes through the location of the second electronic device. Therefore, coordinates of the second electronic device in the b system are (0, $r_i$, 0). The foregoing matrix $$\begin{bmatrix} 0 \\ r_i \\ 0 \end{bmatrix}_b$$

is obtained based on the coordinates (0, $r_i$, 0) of the second electronic device in the b system, $r_i$ is a modulus of the vector $K_iR$, that is, a length of the vector KR. The vector $K_iR$ is a vector in e in the U system. It should be noted again that ($x_i$, $y_i$, $z_i$), the pitch angle $\varphi_i$, the azimuth angle $\phi_i$, and the roll angle $\theta_i$ are all known, and (x, y, z) and $r_i$ are both unknown.

With reference to the foregoing formula (10) and the formula (11), the following formula (13) may be obtained further to obtain Formula (14):

$$\begin{bmatrix} x \\ y \\ z \end{bmatrix}_U - \begin{bmatrix} x_i \\ y_i \\ z_i \end{bmatrix}_U = C_b^{U(i)} \cdot \begin{bmatrix} 0 \\ r_1 \\ 0 \end{bmatrix}_b \quad \text{Formula (13)}$$

$$\begin{bmatrix} x \\ y \\ z \end{bmatrix}_U - \begin{bmatrix} (-\cos\varphi_i \sin\phi_i) \times r_i \\ (-\cos\varphi_i \cos\phi_i) \times r_i \\ \sin\varphi_i \times r_i \end{bmatrix} = \begin{bmatrix} x_i \\ y_i \\ z_i \end{bmatrix}_U \quad \text{Formula (14)}$$

$$(-\cos\varphi_i \sin\phi_i) \times r_i \text{ in } \begin{bmatrix} (-\cos\varphi_i \sin\phi_i) \times r_i \\ (-\cos\varphi_i \cos\phi_i) \times r_i \\ \sin\varphi_i \times r_i \end{bmatrix}$$

in the formula (14) is a product of $r_i$ and an element of a first-row second-column of $$C_b^{U(i)}$$

in the formula (12), which may be expressed as $$C_b^{U(i)}(1, 2) \times r_i.$$

Similarly, $(-\cos\ \varphi_i\ \cos\ \phi_1) \times r_i$ in the formula (14) is a product of $r_i$ and an element of a second-row second-column of $$C_b^{U(i)}$$

in the formula (12), which may be expressed as $$C_b^{U(i)}(2, 2) \times r_i. \ \sin\varphi_i \times r_i$$

in the formula (14) is a product of an element of a third-row second-column in the formula (12) and $r_i$, which may be expressed as $$C_b^{U(i)}(3, 2) \times r_i.$$

That is, $$C_b^{U(i)}(1, 2) = -\cos\varphi_i \sin\phi_i,\ C_b^{U(i)}(2, 2) = -\cos\varphi_i \cos\phi,\ C_b^{U(i)}(3, 2) = \sin\varphi_i.$$

Therefore, the foregoing formula (14) may be transformed into the following formula (15):

$$\begin{bmatrix} x \\ y \\ z \end{bmatrix}_U - \begin{bmatrix} C_b^{U(i)}(1, 2) \times r_1 \\ C_b^{U(i)}(2, 2) \times r_1 \\ C_b^{U(i)}(3, 2) \times r_1 \end{bmatrix} = \begin{bmatrix} x_i \\ y_i \\ z_i \end{bmatrix}_U \quad \text{Formula (15)}$$

It can be obtained from the formula (15) that x−

$$C_b^{U(i)}(1, 2) \times r_i = x_i,\ y - C_b^{U(1)}(2, 2) \times r_i = y_i, \text{ and } z - C_b^{U(1)}(3, 2) \times r_i = z_i.$$

The following matrix equation (1) may be obtained according to the foregoing formula (15) and with reference to n pieces of attitude information that are of the third electronic device 300 and that are obtained by the third electronic device 300 through measurement at n locations:

$$AX = B \quad \text{Matrix equation (1)}$$

$$\text{where } A = \begin{bmatrix} 1 & 0 & 0 & C_b^{U(1)}(1, 2) & \ldots & 0 \\ 0 & 1 & 0 & C_b^{U(1)}(2, 2) & \ldots & 0 \\ 0 & 0 & 1 & C_b^{U(1)}(3, 2) & \ldots & 0 \\ \ldots & \ldots & \ldots & \ldots & \ldots & \ldots \\ 1 & 0 & 0 & 0 & \ldots & C_b^{U(n)}(1, 2) \\ 0 & 1 & 0 & 0 & \ldots & C_b^{U(n)}(2, 2) \\ 0 & 0 & 1 & 0 & \ldots & C_b^{U(n)}(3, 2) \end{bmatrix},$$

$$X = \begin{bmatrix} x \\ y \\ z \\ -r_1 \\ \ldots \\ -r_n \end{bmatrix},\ B = \begin{bmatrix} x_1 \\ y_1 \\ z_1 \\ \ldots \\ x_n \\ y_n \\ z_n \end{bmatrix}$$

The third electronic device 300 may solve the foregoing matrix equation (1) by using a formula $X=(A^TA)^{-1}A^TB$, where $A^T$ is a transposed matrix of A, and $$A^T = \begin{bmatrix} 1 & 0 & 0 & \ldots & 1 & 0 & 0 \\ 0 & 1 & 0 & \ldots & 0 & 1 & 0 \\ 0 & 0 & 1 & \ldots & 0 & 0 & 1 \\ C_b^{U(1)}(1, 2) & C_b^{U(1)}(2, 2) & C_b^{U(1)}(3, 2) & \ldots & 0 & 0 & 0 \\ \ldots & \ldots & \ldots & \ldots & \ldots & \ldots & \ldots \\ 0 & 0 & 0 & \ldots & C_b^{U(n)}(1, 2) & C_b^{U(n)}(2, 2) & C_b^{U(n)}(3, 2) \end{bmatrix}.$$

$A^TA$ indicates a product of $A^T$ and A. $(A^TA)^{-1}$ is an inverse matrix of $A^TA$. X is equal to the inverse matrix of $A^TA$ times $A^T$, and times B.

The third electronic device 300 may obtain a matrix X through calculation by using $X=(A^TA)^{-1}A^TB$, that is, $$\begin{bmatrix} x \\ y \\ z \\ -r_1 \\ \cdots \\ -r_n \end{bmatrix}.$$

That is, the third electronic device 300 may obtain through calculation the coordinates R (x, y, z) of the second electronic device in the U system.

A method for solving a location of another second electronic device 200 is the same as that described herein. Details are not described again. Then, when the third electronic device 300 is located in the area 2, the third electronic device 300 may request the second electronic device 200 to measure the distance, and then obtain a current location of the third electronic device 300 through calculation based on the distance obtained through measurement and the locations of each second electronic device 200. That is, positioning, navigation, and the like of the third electronic device 300 located in the area 2 are implemented by using the second electronic device 200.

In conclusion, it can be learned that the location of the second electronic device 200 obtained through calculation and the location of the first electronic device 100 are coordinates in a same navigation coordinate system that is, an effect of unified coordinate systems of the area 2 and the area 1 is implemented. In other words, in this application, a unified navigation coordinate system is established in different areas, and a to-be-positioned device does not need to store information about a plurality of navigation coordinate systems. This reduces a storage load of the to-be-positioned device, and reduces an algorithm used when the to-be-positioned device is positioned in different areas. It is also beneficial to ensure positioning accuracy in different areas. In addition, when the to-be-positioned device moves in different areas, the user does not need to perform a plurality of initial attitude calibrations on the to-be-positioned device either, and this improves user experience.

In the foregoing embodiment, the technical solutions of this application are described by using an example in which at least three UWB base stations (that is, the first electronic device 100) with a single-antenna architecture are disposed in the area 1 and at least three (three are used as an example) UWB base stations (that is, the second electronic device 200) with a single-antenna architecture are disposed in the area 2. In some other embodiments, a UWB base station (that is, the first electronic device 100) with a multi-antenna architecture may be disposed in the area 1, and a UWB base station (that is, the second electronic device 200) with a multi-antenna architecture may be disposed in the area 2. It should be noted that a method for measuring the coordinates of the third electronic device in the U system by the three UWB base stations with the single-antenna architectures is different from a method for measuring the coordinates of the third electronic device in the U system by the UWB base station with a multi-antenna architecture. Therefore, in an execution procedure, it is slightly different from that in FIG. 4A-1 and FIG. 4A-2.

In the method for measuring the location of the third electronic device by using three UWB base stations with the single-antenna architecture, the third electronic device needs to separately send a ranging request to the three UWB base stations with the single-antenna architecture. Then, the three UWB base stations with the single-antenna architecture respectively respond to the third electronic device. The third electronic device may obtain, through calculation based on, for example, a bidirectional ranging method, distances between the third electronic device and the three UWB base stations with the single-antenna architecture, and then, based on the three distances, coordinates of the third electronic device in the U system may be calculated by using a triangulation-based positioning principle. It can be learned that each time the coordinates of the third electronic device in the U system need to be measured, the third electronic device needs to interact with each UWB base station with a single-antenna architecture, and the third electronic device obtains the coordinates of the third electronic device in the U system through calculation. In addition, in step S408, the third electronic device needs to calculate coordinates of three second electronic device with a single-antenna architecture in the U system.

In the method for measuring the location of the third electronic device by using one UWB base station with a multi-antenna architecture, the third electronic device only needs to send a ranging request to the one UWB base station with the multi-antenna architecture. Then, the UWB base station with the multi-antenna architecture responds to the third electronic device. The third electronic device may obtain a distance between the UWB base station with the multi-antenna architecture and the third electronic device through calculation based on, for example, the bidirectional ranging method, and may further determine a vector from the third electronic device to the multi-antenna architecture based on a time difference between the third electronic device to different antennas. Then, the coordinates of the third electronic device in the U system are obtained through calculation based on one distance and one vector. It can be learned that, when the coordinates of the third electronic device in the U system need to be measured, the third electronic device only needs to interact with one UWB base station with the multi-antenna architecture, and the UWB base station with the multi-antenna architecture obtains the coordinates of the third electronic device in the U system through calculation. Then, the UWB base station with the multi-antenna architecture sends the calculated coordinates of the third electronic device in the U system to the third electronic device, so that the third electronic device performs subsequent calculation. In addition, in step S408, the third electronic device only needs to calculate the coordinates of one second electronic device with the multi-antenna architecture in the U system.

In some other embodiments, one UWB base station (that is, the first electronic device 100) with a multi-antenna architecture may be alternatively disposed in the area 1, and at least three UWB base stations (that is, the second electronic devices 200) with single-antenna architectures may be disposed in the area 2. Alternatively, at least three UWB base stations (that is, the first electronic devices 100) with single-antenna architectures are disposed in the area 1, and one UWB base station (that is, the second electronic device 200) with a multi-antenna architecture may be disposed in the area 2. Details are not described herein again.

Figure 8:
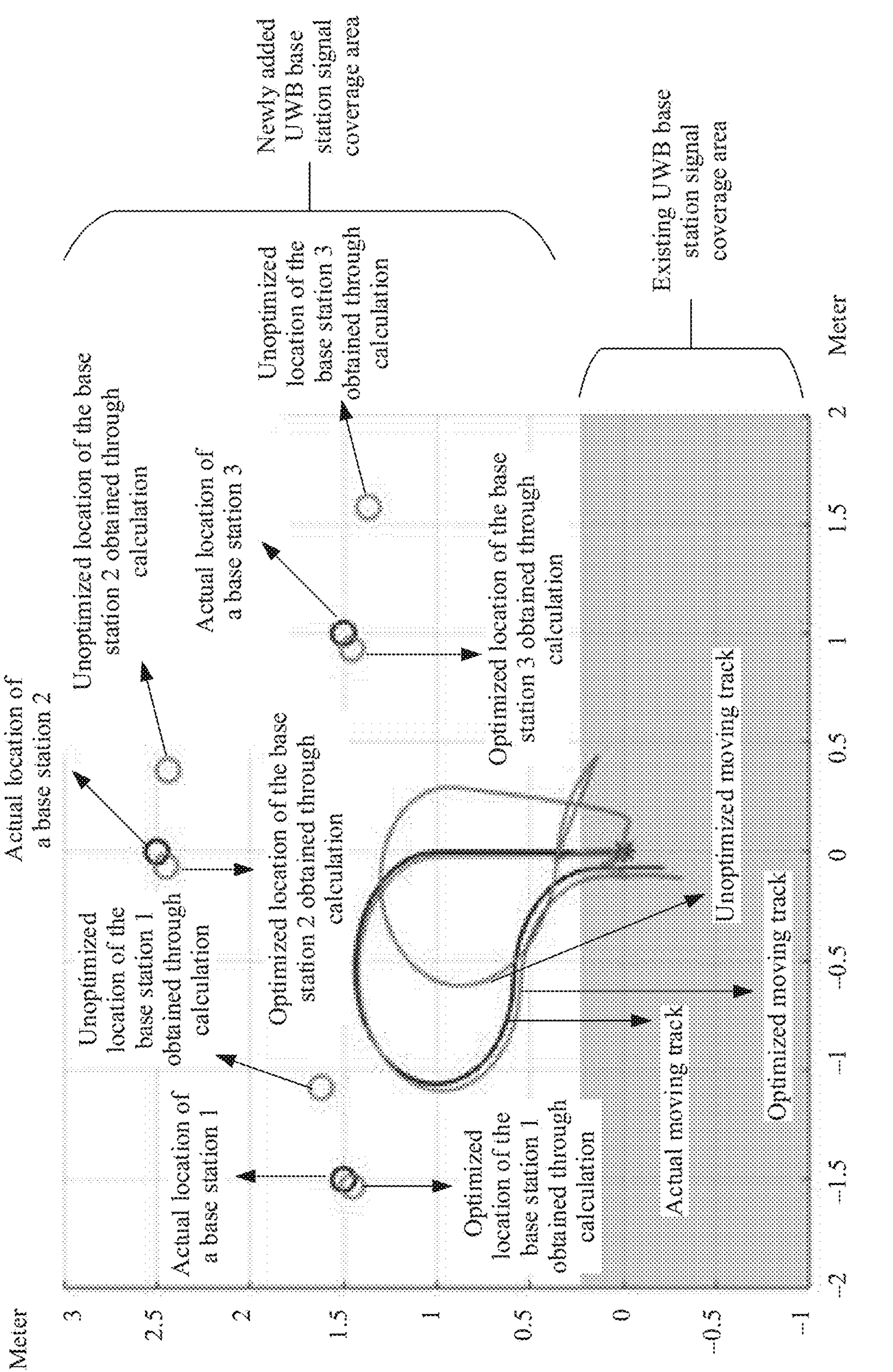
FIG. 8 is a comparison diagram of results of a simulation experiment according to an embodiment of this application.

FIG. 8 shows data of a set of simulation experiments. A moving track of a mobile phone (that is, a third electronic device 300) for 10 s is simulated in a simulated space scene, and gyroscope and acceleration original data are generated by simulation. In the figure, areas marked in gray are signal coverage areas of existing UWB base stations, and areas marked in white are signal coverage areas of newly added UWB base stations. A total of three newly added base stations to be initialized are disposed in a newly expanded area (that is, the white area), which are distributed as a base station 1, a base station 2, and a base station 3. Actual locations of the three base stations are shown in the following figure. In addition, a three-axis fixed bias of a gyroscope is set to 0.1 deg/s (degree/s), and a random noise of the gyroscope is set to 1 deg/sqrt(s)(degree/$m^2$).

FIG. 8 marks moving track data (that is, an unoptimized moving track) obtained by the mobile phone solving by using only data of an IMU, and an estimated location (marked in the figure) of a newly added base station obtained through calculation by using the unoptimized moving track. An average positioning error of the newly added base station is 0.5 m. FIG. 8 further marks a moving track obtained after the data obtained through IMU measurement is corrected by using the data (the location is obtained after the mobile phone returns to the signal coverage area of the existing UWB base station) measured by the existing UWB base station, and an estimated location (marked in the figure) of the newly added base station that is calculated by using the optimized moving track, where an average positioning error is reduced to 0.1 m.

It can be learned that, after the data measured by the existing UWB base station is used to optimize the moving track obtained through the IMU measurement, positioning accuracy of the newly added base station is improved.

It may be understood that to implement the foregoing functions, the terminal and the like include corresponding hardware structures and/or software modules for performing the functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of the present invention.

In embodiments of this application, the terminal and the like may be divided into functional modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that in embodiments of the present invention, module division is an example, and is merely a logical function division. During actual implementation, another division manner may be used.

Based on descriptions about the foregoing implementations, a person skilled in the art may clearly understand that, for a purpose of convenient and brief description, division into the foregoing functional modules is used as an example for illustration. In actual application, the foregoing functions may be allocated to different functional modules and implemented according to a requirement. In other words, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Functional units in each of embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, like a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for initializing a second electronic device as a newly added base station in an ultra-wideband (UWB) system, implemented by a third electronic device, and comprising:

sending a first UWB signal to a first electronic device to measure a first coordinate set corresponding to a first location in a first area in a navigation coordinate system when the third electronic device is located at the first location;

starting an inertial measurement unit (IMU) measurement of the third electronic device to obtain data when the third electronic device is located at the first location;

moving from the first area to a second area;

sending, when the third electronic device is located at second locations in the second area, a second UWB signal to the second electronic device to measure a first distance between the third electronic device at the second locations and the second electronic device;

returning to the first area;

sending, when the third electronic device is located at a third location in the first area, a third UWB signal to the first electronic device to measure a second coordinate set corresponding to the third location in the navigation coordinate system; and obtaining, through calculation, first coordinates of the second electronic device in the navigation coordinate system based on the first coordinate set, the data, the second coordinate set, and the first distance.

2. The method of claim 1, wherein obtaining the first coordinates comprises:

obtaining, through calculation based on the first coordinate set and the data, a third coordinate set corresponding to the third location;

calculating, based on the third coordinate set and the second coordinate set, an offset value between motion data of the third electronic device and the data;

obtaining the motion data through calculation based on the offset value and the data;

calculating, based on the motion data and the first coordinate set, a fourth coordinate set corresponding to the second location; and obtaining the first coordinates through calculation based on the fourth coordinate set and the first distance.

3. The method of claim 2, wherein calculating the offset value comprises calculating, based on the third coordinate set and the second coordinate set in a Kalman filtering method, the offset value.

4. The method of claim 1, further comprising:

entering the second area again;

sending, in response to entering the second area again, a fourth UWB signal to the second electronic device to measure a second distance between the third electronic device and the second electronic device; and calculating second coordinates of a current location of the third electronic device in the navigation coordinate system based on the second distance and the first coordinates.

5. The method of claim 1, further comprising:

identifying that the third electronic device is at the third location; and closing or suspending, in response to identifying that the third electronic device is at the third location, the IMU measurement.

6. The method of claim 1, wherein the second electronic device and the first electronic device have different communication addresses.

7. The method of claim 6, wherein the second electronic device and the first electronic device have different communication timeslots or pseudo random binary sequences.

8. The method of claim 1, wherein before sending the first UWB signal, the method further comprises:

receiving an operation of a user instructing to initialize the second electronic device; and sending, in response to receiving the operation, a prompt to the user to carry the third electronic device into the first area.

9. The method of claim 1, wherein before moving from the first area to the second area, the method further comprises sending a prompt to a user to carry the third electronic device into the second area.

10. A method for initializing a second electronic device as a newly added base station in an ultra-wideband (UWB) system implemented by a third electronic device, and comprising:

sending a first UWB signal to a first electronic device to measure a first coordinate set corresponding to a first location in a first area in a navigation coordinate system when the third electronic device is located at the first location;

starting an inertial measurement unit (IMU) measurement of the third electronic device to obtain data when the third electronic device is located at the first location;

moving from the first area to a second area;

obtaining, when the third electronic device is at second locations in the second area, attitude information of the third electronic device in pointing to the second electronic in at least two second locations;

returning to the first area;

sending, when the third electronic device is located at a third location in the first area, a second UWB signal to the first electronic device to measure a second coordinate set corresponding to the third location in the navigation coordinate system; and obtaining, through calculation, first coordinates of the second electronic device in the navigation coordinate system based on the first coordinate set, the data, the second coordinate set, and the attitude information.

11. The method of claim 10, wherein the third electronic device pointing to the second electronic device comprises pointing a preset axis of a carrier coordinate system of the third electronic device to the second electronic device.

12. The method of claim 10, wherein obtaining the first coordinates comprises:

obtaining, through calculation based on the first coordinate set and the data, a third coordinate set corresponding to the third location;

calculating, based on the third coordinate set and the second coordinate set, an offset value between motion data of the third electronic device and the data;

obtaining the motion data through calculation based on the offset value and the data;

calculating, based on the motion data and the first coordinate set, a fourth coordinate set corresponding to the second location; and obtaining the first coordinates based on the fourth coordinate set and the attitude information.

13. The method of claim 12, wherein calculating the offset value comprises calculating, based on the third coordinate set and the second coordinate set in a Kalman filtering method, the offset value.

14. The method of claim 10, further comprising:

entering the second area again;

sending, in response to entering the second area again, a third UWB signal to the second electronic device to measure a distance between the third electronic device and the second electronic device; and calculating second coordinates of a current location of the third electronic device in the navigation coordinate system based on the distance and the first coordinates.

15. The method of claim 10, further comprising:

identifying that the third electronic device is at the third location; and closing or suspending, in response to identifying that the third electronic device is at the third location, the IMU measurement.

16. The method of claim 10, wherein the second electronic device and the first electronic device have different communication addresses.

17. The method of claim 16, wherein the second electronic device and the first electronic device have different communication timeslots or pseudo random binary sequences.

18. The method of claim 10, wherein before sending the first UWB signal, the method further comprises:

receiving an operation of a user instructing to initialize the second electronic device; and sending, in response to receiving the operation, a prompt to the user to carry the third electronic device into the first area.

19. The method of claim 10, wherein before moving from the first area to the second area, the method further comprises sending a prompt to a user to carry the third electronic device into the second area.

20. A computer program product comprising computer-executable instructions that are stored on a non-transitory computer-readable storage medium and that, when executed by a processor, cause a third electronic device to:

send a first ultra-wideband (UWB) signal to a first electronic device to measure a first coordinate set corresponding to a first location in a first area in a navigation coordinate system when the third electronic device is located at the first location;

start an inertial measurement unit (IMU) measurement of the third electronic device to obtain data when the third electronic device is located at the first location;

move from the first area to a second area;

send, when the third electronic device is located at second locations in the second area, a second UWB signal to a second electronic device to measure a distance between the third electronic device at the second locations and the second electronic device;

return to the first area;

send, when the third electronic device is located at a third location in the first area, a third UWB signal to the first electronic device to measure a second coordinate set corresponding to the third location in the first area in the navigation coordinate system; and obtain, through calculation, coordinates of the second electronic device in the navigation coordinate system based on the first coordinate set, the data, the second coordinate set, and the distance.

* * * * *